US010127701B2

(12) United States Patent
Matsuzaki et al.

(10) Patent No.: US 10,127,701 B2
(45) Date of Patent: Nov. 13, 2018

(54) IMAGE PROCESSING APPARATUS AND CONTROL METHOD THEREOF

(71) Applicant: CANON KABUSHIKI KAISHA, Tokyo (JP)

(72) Inventors: Eiichi Matsuzaki, Hiratsuka (JP); Toru Koike, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 15/178,759

(22) Filed: Jun. 10, 2016

(65) Prior Publication Data

US 2016/0284113 A1 Sep. 29, 2016

Related U.S. Application Data

(62) Division of application No. 13/595,329, filed on Aug. 27, 2012.

(30) Foreign Application Priority Data

Sep. 2, 2011 (JP) .................................. 2011-191904
Jul. 30, 2012 (JP) .................................. 2012-168674

(51) Int. Cl.
*G06T 7/13* (2017.01)
*G06T 11/60* (2006.01)
(Continued)

(52) U.S. Cl.
CPC ............ G06T 11/60 (2013.01); G06K 9/4604 (2013.01); G06T 1/20 (2013.01); G06T 5/20 (2013.01);
(Continued)

(58) Field of Classification Search
CPC ............................................. G09G 2320/0613
See application file for complete search history.

(56) References Cited

U.S. PATENT DOCUMENTS 4,947,269 A 8/1990 Yamada
5,452,105 A * 9/1995 Tamagaki .......... H04N 1/00005
358/448
(Continued)

FOREIGN PATENT DOCUMENTS

JP 06-334960 A 12/1994
JP 2008-263646 A 10/2008
(Continued)

OTHER PUBLICATIONS

The above foreign references #3. and #4. were cited in a Jul. 30, 2013 Japanese Office Action, which is inclosed without English Translation, that issued in Japanese Patent Application No. 2012-168674.
(Continued)

*Primary Examiner* — Jitesh Patel
(74) *Attorney, Agent, or Firm* — Cowan, Liebowitz & Latman, P.C.

(57) ABSTRACT

The image processing apparatus includes a determination unit that determines whether a plurality of input images are a plurality of divided images or a plurality of independent images, an adding unit that adds a margin image to an edge portion of each input image, an image processing unit that performs image processing on the plurality of input images to each of which the margin image has been added when the plurality of input images are the plurality of divided images, and performs image processing on the plurality of images to each of which the margin image generated from another input image has not been added when the plurality of input images are the plurality of independent, and a synthesizing unit that generates one synthesized image by synthesizing the plurality of input images on which image processing has been performed by the image processing unit.

28 Claims, 14 Drawing Sheets

(51) Int. Cl.
  *G06T 1/20*    (2006.01)
  *G09G 5/36*    (2006.01)
  *G06T 5/20*    (2006.01)
  *G06K 9/46*    (2006.01)
  *G06F 3/14*    (2006.01)
(52) U.S. Cl.
  CPC ............... *G06T 7/13* (2017.01); *G09G 5/363* (2013.01); *G06F 3/1438* (2013.01); *G06F 3/1446* (2013.01); *G06T 2207/20021* (2013.01); *G06T 2207/20221* (2013.01); *G09G 2320/0613* (2013.01); *G09G 2360/02* (2013.01); *G09G 2360/06* (2013.01)

(56) References Cited

U.S. PATENT DOCUMENTS

| | | | |
|---|---|---|---|
| 5,515,181 | A | 5/1996 | Iyoda et al. |
| 5,644,411 | A * | 7/1997 | Tamagaki .......... H04N 1/00005 358/453 |
| 5,708,513 | A | 1/1998 | Hasuo et al. |
| 6,381,376 | B1 * | 4/2002 | Toyoda ................ H04N 1/3876 358/450 |
| 2001/0031099 | A1 | 10/2001 | Kondo et al. |
| 2002/0051205 | A1 | 5/2002 | Teranishi et al. |
| 2002/0054217 | A1 | 5/2002 | Matsuda et al. |
| 2003/0016870 | A1 * | 1/2003 | Waida ..................... G06K 9/50 382/218 |
| 2003/0189581 | A1 * | 10/2003 | Nasoff ..................... G06F 3/14 345/660 |
| 2004/0150856 | A1 * | 8/2004 | Asai ...................... G03G 15/36 358/1.18 |
| 2007/0067713 | A1 * | 3/2007 | Ming .................. G06F 17/2211 715/235 |
| 2007/0127087 | A1 | 6/2007 | Nabemoto et al. |
| 2008/0068033 | A1 * | 3/2008 | Kagami ............. G01R 31/2891 324/750.23 |
| 2010/0014780 | A1 * | 1/2010 | Kalayeh .................... G06T 1/00 382/284 |
| 2010/0128971 | A1 * | 5/2010 | Kamiya ............. G06K 9/00637 382/154 |
| 2010/0157079 | A1 * | 6/2010 | Atanassov ................ G06T 5/50 348/222.1 |
| 2011/0194127 | A1 | 8/2011 | Nagakoshi et al. |
| 2011/0200254 | A1 * | 8/2011 | Taniguchi ............ G09G 3/3611 382/173 |

FOREIGN PATENT DOCUMENTS

| | | |
|---|---|---|
| JP | 2009-225446 A | 10/2009 |
| JP | 2009-284094 A | 12/2009 |
| JP | 2010-245961 A | 10/2010 |
| JP | 2011-107558 A | 6/2011 |

OTHER PUBLICATIONS

The above foreign references #5. and #6. were cited in a Nov. 5, 2013 Japanese Office Action, which is inclosed without English Translation, that issued in Japanese Patent Application No. 2012-168674.

* cited by examiner

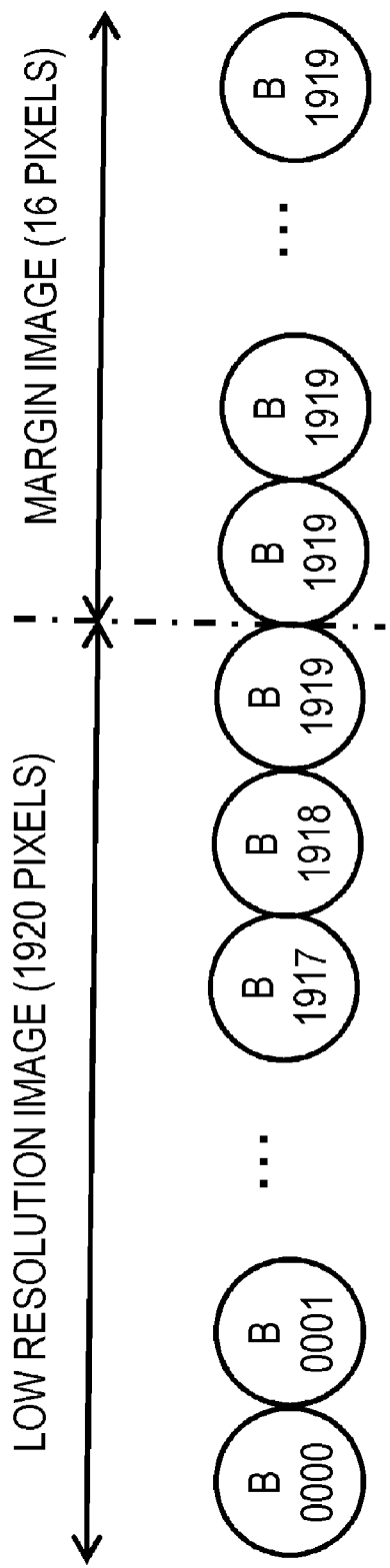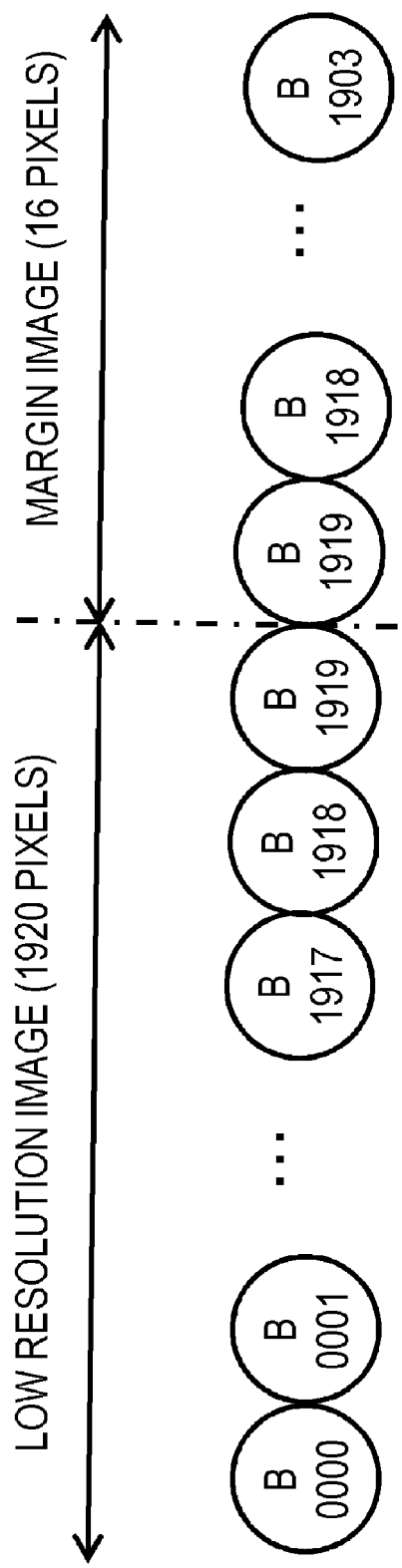
FIG. 5A
FIG. 5B

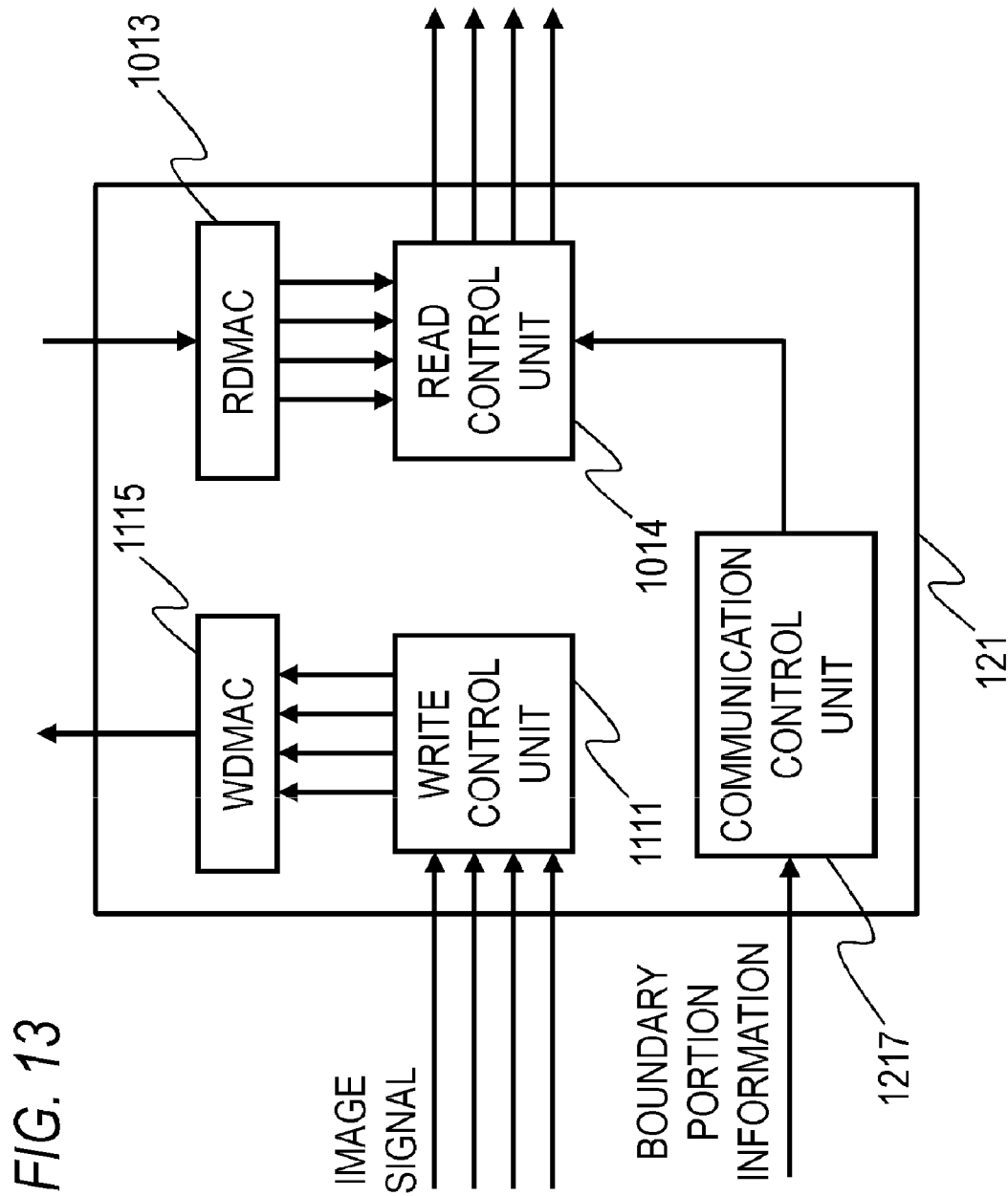

IMAGE PROCESSING APPARATUS AND CONTROL METHOD THEREOF

CROSS-REFERENCE TO RELATED APPLICATIONS

This application is a divisional of application Ser. No. 13/595,329, filed Aug. 27, 2012 the entire disclosure of which is hereby incorporated by reference.

BACKGROUND OF THE INVENTION

Field of the Invention

The present invention relates to an image processing apparatus and a control method thereof.

Description of the Related Art

In recent years, a high resolution image format is being proposed. For example, in digital cinema, an image format in a number of pixels (3840×2160 pixels) that is quadruple the number of pixels of full high definition (HD: 1920×1080 pixels) is being proposed.

In order to process this kind of image having a high resolution (high resolution image), a high-speed signal processing circuit is required. Nevertheless, the device cost will increase if such a high-speed signal processing circuit is used.

Thus, considered is a method of processing a high resolution image using a low-speed signal processing circuit by dividing the high resolution image into a plurality of divided images, and performing image processing, in parallel, on the plurality of divided images by using a plurality of signal processing circuits.

Nevertheless, when spatial filter processing of referring to a neighborhood pixel is performed on the divided image, appropriate processing results cannot be obtained since the values of proper pixels (pixels of other divided images) are not referred to at the boundary portion with the other divided images. Thus, when generating a high resolution image by synthesizing the divided images that have been subjected to image processing and subsequently displaying such high resolution image, the pixel values between the divided images become discontinuous, and there are cases where a boundary line becomes visible.

In order to resolve the foregoing problem, proposed is technology of adding, to an edge portion of a divided image, a margin image generated from a divided image (adjacent image) which is adjacent to that divided image upon dividing a high resolution image into a plurality of divided images (for example, refer to Japanese Patent Application Publication No. 2010-245961 or Japanese Patent Application Publication No. 2008-263646). By using the foregoing technology, it is possible to obtain appropriate processing results at the boundary portion between the divided images, and inhibit the generation of the boundary line described above. This kind of technology is disclosed in, for example, Japanese Patent Application Publication No. 2010-245961 and Japanese Patent Application Publication No. 2008-263646.

SUMMARY OF THE INVENTION

Nevertheless, there are cases where a multi constructed image (image in which a plurality of independent images, which are respectively independent, are arranged) is input to the image processing apparatus. When the input image is a multi constructed image and a margin image generated from the adjacent image of an independent image is added to an edge portion of that independent image, there are cases where an appropriate processing result cannot be obtained at the boundary portion between the independent images. For instance, when image processing of referring to a neighborhood pixel is performed on the independent image to which the foregoing margin image has been added, pixel values of other independent images which are unrelated to the independent image to be processed are referred to at the boundary position with the other independent images. Thus, an appropriate processing result cannot be obtained.

Thus, the present invention provides technology capable of obtaining an appropriate image processing result upon performing image processing on a plurality of input images, and generating a synthesized image in which the plurality of input images having been subjected to the foregoing image processing are arranged.

An image processing apparatus according to the present invention comprises:

a determination unit that determines whether a plurality of input images are a plurality of divided images obtained by dividing one single constructed image, or a plurality of independent images which are respectively independent;

an adding unit that adds, to an edge portion of each input image, a margin image generated from an input image that is adjacent to that input image in the single constructed image when the plurality of input images are determined by the determination unit to be the plurality of divided images;

an image processing unit that performs image processing on the plurality of input images; and a synthesizing unit that generates one synthesized image by synthesizing the plurality of input images on which image processing has been performed by the image processing unit, wherein the image processing unit performs image processing on the plurality of input images to each of which the margin image has been added by the adding unit when the plurality of input images are determined by the determination unit to be the plurality of divided images, and performs image processing on the plurality of images to each of which the margin image generated from another input image has not been added when the plurality of input images are determined by the determination unit to be the plurality of independent images.

A method of controlling an image processing apparatus according to the present invention comprises:

a determination step of determining whether a plurality of input images are a plurality of divided images obtained by dividing one single constructed image, or a plurality of independent images which are respectively independent;

an adding step of adding, to an edge portion of each input image, a margin image generated from an input image that is adjacent to the relevant input image in the single constructed image when the plurality of input images are determined in the determination step to be the plurality of divided images;

an image processing step of performing image processing on the plurality of input images; and a synthesizing step of generating one synthesized image by synthesizing the plurality of input images on which image processing has been performed in the image processing step, wherein, in the image processing step, image processing is performed on the plurality of input images to each of which the margin image has been added in the adding step when the plurality of input images are determined in the determination step to be the plurality of divided images, and image processing is performed on the plurality of images to each of which the margin image generated from another input image has not been added when the plurality of input images are determined in the determination step to be the plurality of independent images.

According to the present invention, it is possible to obtain an appropriate image processing result upon performing image processing to a plurality of input images, and generating a synthesized image in which the plurality of input images having been subjected to the foregoing image processing are arranged.

Further features of the present invention will become apparent from the following description of exemplary embodiments with reference to the attached drawings.

BRIEF DESCRIPTION OF THE DRAWINGS

FIGS. 5A and 5B are diagrams showing an example of a situation where a margin image is added to a low resolution image;

FIG. 13 is a diagram showing an example of the functional configuration of the input processing unit according to Embodiment 3.

DESCRIPTION OF THE EMBODIMENTS

An image processing apparatus and a control method thereof according to an embodiment of the present invention are now explained.

<Embodiment 1>

Figure 1:
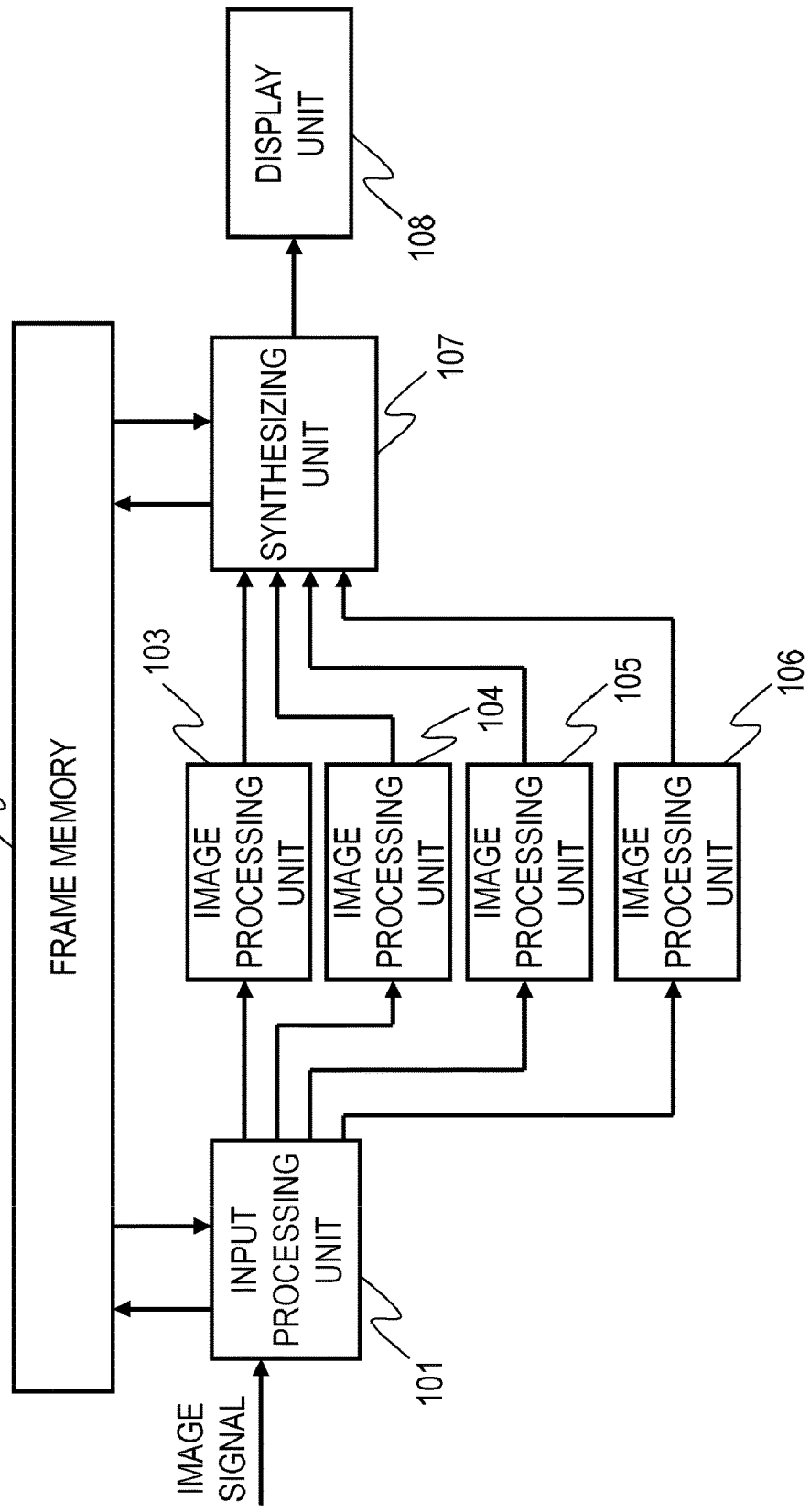
FIG. 1 is a diagram showing an example of the functional configuration of the image processing apparatus according to Embodiment 1.

FIG. 1 is a block diagram showing an example of the functional configuration of an image processing apparatus according to Embodiment 1. As shown in FIG. 1, the image processing apparatus according to this embodiment includes an input processing unit 101, a frame memory 102, image processing units 103 to 106, a synthesizing unit 107, a display unit 108, and so on.

The input processing unit 101 generates a plurality of low resolution images (input images) by dividing an image (original image) which was input. Specifically, the input processing unit 101 writes the original image in the frame memory 102. Subsequently, the input processing unit 101 reads the original image written into the frame memory 102 by dividing the original image into a plurality of low resolution images, and outputs the plurality of low resolution images to the image processing units 103 to 106. Details regarding the input processing unit 101 will be explained later.

Note that while this embodiment adopts a configuration where the original image is divided into four low resolution images and the four low resolution images are respectively input to four image processing units, the configuration is not limited thereto. The number of divisions (number of divided images) may be two (image is divided into two divided images in the vertical or horizontal direction), three (image is divided into three divided images in the vertical or horizontal direction), six (image is divided into two divided images in the vertical direction×three divided images in the horizontal direction, or divided into three divided images in the vertical direction×two divided images in the horizontal direction), nine (image is divided into three divided images in the vertical direction×three divided images in the horizontal direction), and so on.

Moreover, there is no particular limitation in the number of pixels of a "low resolution image". In this embodiment, images that are obtained by dividing the original image are referred to as low resolution images since they have fewer pixels than the original image.

Note that the "resolution" in the present invention is not limited to a pixel density of a determined region such as numbers of pixels included to a region of which a size is 1 inch×1 inch. The "resolution" in the present invention means numbers of pixels included to an image. Thus, the "low resolution image" in the present invention means an image of which numbers of pixels is low and is not limited to an image of which the pixel density is low. The "high resolution image" in the present invention means an image of which numbers of pixels is high and is not limited to an image of which the pixel density is high. The "resolution" used in the claims, the specification and the drawings is defined as above mentioned.

The image processing units 103 to 106 perform image processing on the plurality of low resolution images. Specifically, the image processing units 103 to 106 respectively perform image processing on the low resolution image output from the input processing unit 101, and outputs the low resolution image on which image processing has been performed to the synthesizing unit 107. In this embodiment, the image processing units are prepared in the same quantity as the number of low resolution images so as to perform the image processing on the respective low resolution images in parallel. Note that this embodiment adopts a configuration of using the same number of image processing units as the number of low resolution images (configuration in which the low resolution image and the image processing unit are one-to-one), but the configuration is not limited thereto. For example, one image processing unit may be provided to a plurality of low resolution images. Specifically, the original image may be divided into eight low resolution images, and the eight low resolution images may be input to the image processing units 103 to 106 by two, and undergo image processing.

The synthesizing unit 107 generates one synthesized image by synthesizing the plurality of low resolution images on which image processing has been performed by the image processing units 103 to 106. Specifically, the synthesizing unit 107 writes the plurality of low resolution images that were output from the image processing units 103 to 106 in the frame memory 102, reads and synthesizes the plurality of low resolution images that were written in to the frame memory 102, and outputs the synthesized image to the display unit 108.

The display unit 108 displays the synthesized image that was output from the synthesizing unit 107. The display unit 108 may be, for instance, a liquid crystal display panel, a plasma display panel, an organic EL display panel, or the like. Note that, in this embodiment, while the image processing apparatus is configured to include a display unit, the display unit may also be a separate device from the image processing apparatus.

The frame memory 102 is a frame memory that is used for the processing in the input processing unit 101 and the synthesizing unit 107, and is a frame memory that can retain images of a plurality of frames.

Figure 2:
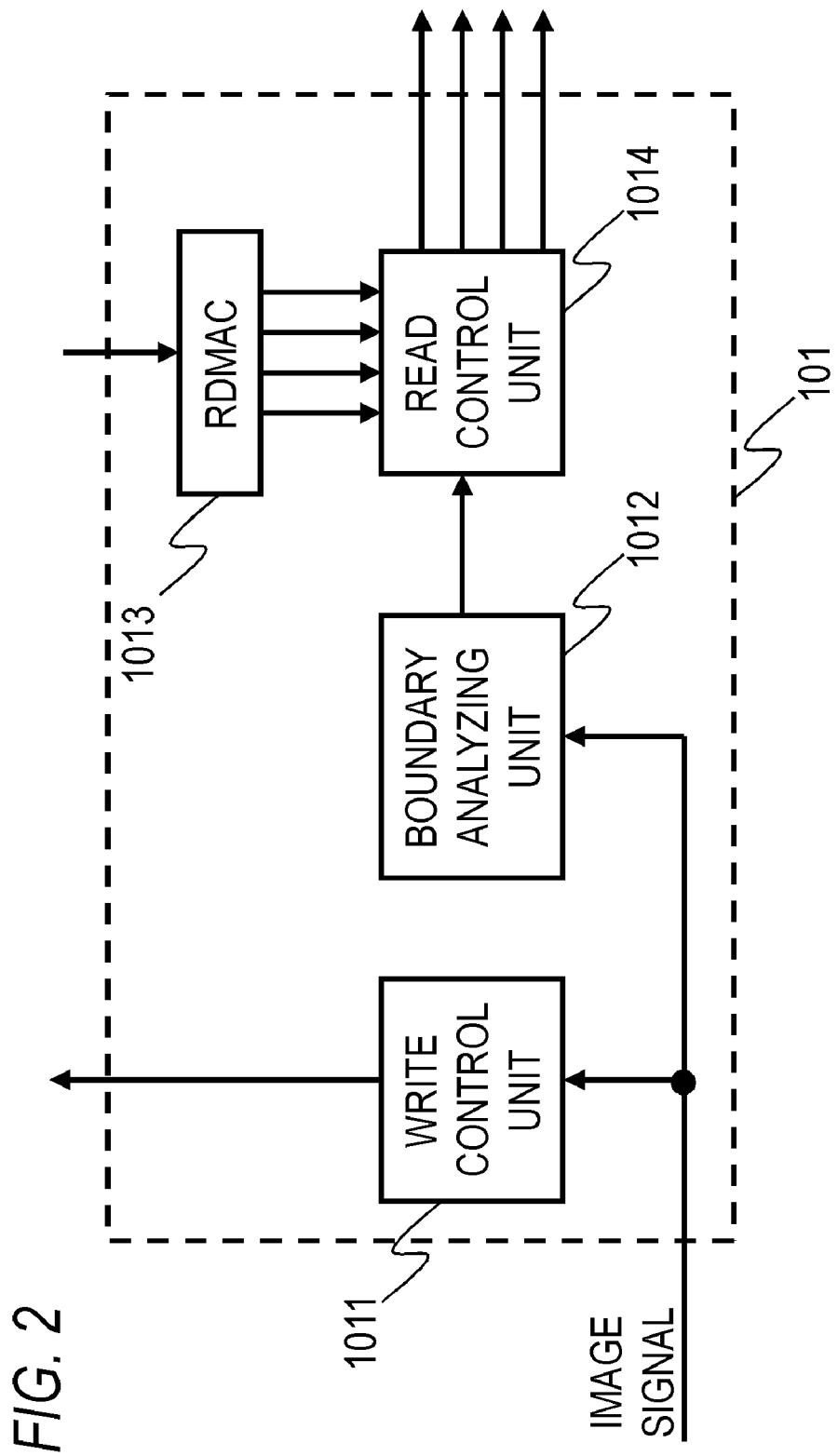
FIG. 2 is a diagram showing an example of the functional configuration of the input processing unit according to Embodiment 1.

FIG. 2 is a block diagram showing an example of the functional configuration of the input processing unit 101. As shown in FIG. 2, the input processing unit 101 includes a write control unit 1011, a boundary analyzing unit 1012, a read direct memory access controller (RDMAC) 1013, a read control unit 1014, and so on.

The write control unit 1011 controls the writing of the original image in the frame memory 102.

The boundary analyzing unit 1012 determines, for each boundary portion between the low resolution images (input images) upon arranging the plurality of low resolution images in a predetermined order, whether a change in a pixel value between the low resolution images is continuous (whether the pixel values have continuity). Specifically, the boundary analyzing unit 1012 determines whether the pixel values from one low resolution image to another low resolution image are changing continuously. Subsequently, the boundary analyzing unit 1012 outputs the determination result to the read control unit 1014.

The read control unit 1014 divides the original image into a plurality of low resolution images, and outputs the plurality of low resolution images to a plurality of image processing units (image processing units 103 to 106) in parallel. Specifically, the read control unit 1014 outputs to the RDMAC 1013, for each low resolution image, a read request for reading that low resolution image from the frame memory 102. Here, the read control unit 1014 determines whether the plurality of low resolution images obtained by dividing the original image are a plurality of divided images obtained by dividing one single constructed image, or a plurality of independent images which are respectively independent. To put it differently, the read control unit 1014 determines whether the original image is one high resolution image, or a multi constructed image in which a plurality of independent images are arranged. In this embodiment, the read control unit 1014 determines whether the plurality of low resolution images are a plurality of divided images or a plurality of independent images based on the determination result of the continuity of the pixel values by the boundary analyzing unit 1012. In addition, the read control unit 1014 outputs the foregoing read request based on the determination result of whether the plurality of low resolution images are a plurality of divided images or a plurality of independent images. The read control unit 1014 outputs, to the plurality of image processing units, the plurality of low resolution images that were output in parallel from the RDMAC 1013 according to the read request.

Note that, when the plurality of low resolution images are a plurality of divided images, since the number of pixels of the single constructed image will be greater than the low resolution image, the single constructed image may also be referred to as a high resolution image.

The RDMAC 1013 adjusts the read request for each low resolution image from the memory read control unit 1014, reads the plurality of low resolution images from the frame memory 102 in parallel, and outputs the read low resolution images to the read control unit 1014.

A specific example of the operation of the image processing apparatus according to this embodiment is now explained in detail.

Figure 3A:
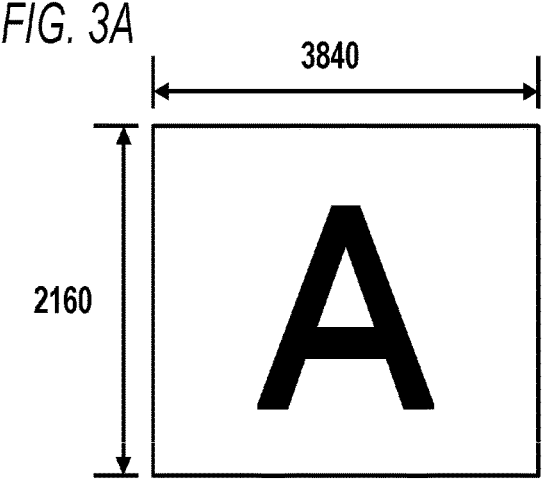
FIGS. 3A to 3E are diagrams showing an example of an original image, a low resolution image, and a margin image according to Embodiment 1.

FIG. 3A is a schematic diagram showing an example of the image (original image) that is input to the image processing apparatus according to this embodiment.

In this embodiment, as shown in FIG. 3A, let it be assumed that an image having 3840 pixels in the horizontal direction and 2160 lines in the vertical direction is input to the image processing apparatus. Note that the size of the original image may be any size. For example, the original image may also be an image in which the number of pixels in the horizontal direction×number of lines in the vertical direction is 1920×1080 or 4096×2160.

Foremost, the write control unit 1011 writes the original image in the frame memory 102.

Simultaneously, the boundary analyzing unit 1012 determines, for each boundary portion between the low resolution images read by the read control unit 1014 (between the low resolution images obtained by dividing the original image), whether the pixel values have continuity at that boundary portion.

Figure 3B:
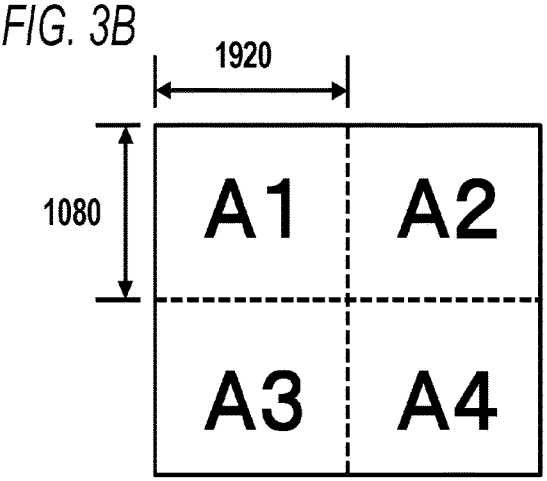

In this embodiment, the read control unit 1014 reads the original image by dividing the original image into four low resolution images. An example of a state where the original image is divided into a plurality of low resolution images is shown in FIG. 3B. In the example of FIG. 3B, the original image illustrated in FIG. 3A is divided into four low resolution images A1 to A4 of a mutually equal size. One low resolution image is an image having 1920 pixels in the horizontal direction and 1080 lines in the vertical direction. Thus, the boundary analyzing unit 1012 determines the foregoing continuity at four boundary portions; namely, the boundary portion of the low resolution images A1 and A2, the boundary portion of the low resolution images A1 and A3, the boundary portion of the low resolution images A2 and A4, and the boundary portion of the low resolution images A3 and A4.

In order to determine the continuity of the pixel values at the boundary portion of the low resolution image A1 and the low resolution image A2, for instance, the boundary analyzing unit 1012 compares the low resolution image A1 and the low resolution image A2 within a predetermined range from the boundary of the low resolution image A1 and the low resolution image A2. Subsequently, the boundary analyzing unit 1012 determines that the pixel values have continuity at the boundary portion of the low resolution image A1 and the low resolution image A2 when the low resolution image A1 and the low resolution image A2 within the foregoing predetermined range are similar. Specifically, the boundary analyzing unit 1012 determines that the low resolution images A1 and A2 within the foregoing predetermined range are similar when the difference between the representative value of the pixel value of the low resolution image A1 within the foregoing predetermined range and the representative value of the pixel value of the low resolution image A2 within the foregoing predetermined range is not greater than a predetermined threshold. The foregoing predetermined range is, for example, an area of pixels in which the distance from the boundary between the low resolution images is N (N=1, 5, 10 or the like).

Note that the method of determining the continuity is not limited to the foregoing method.

For example, it is also possible to respectively compare a plurality of pixel values of one low resolution image within the foregoing predetermined range and a plurality of pixel values of the other low resolution image within the foregoing predetermined range. Specifically, it is possible to respectively calculate the difference between the plurality of pixel values of one low resolution image within the foregoing predetermined range and the plurality of pixel values of the other low resolution image within the foregoing predetermined range. Subsequently, the two divided images within the foregoing predetermined range may be determined as being mutually similar when the respective differences (or the representative values of the differences) are not greater than a predetermined threshold.

In addition, the read control unit 1014 determines whether the plurality of low resolution images are a plurality of divided images (whether the original image is a single constructed image) based on the foregoing determination result of continuity. In this embodiment, the read control unit 1014 determines that the plurality of low resolution images are a plurality of divided images when it is determined that the pixel values have continuity at all boundary portions.

Note that the method of determining whether the plurality of low resolution images are a plurality of divided images is not limited to the foregoing method. For example, it is also possible to determine that the plurality of low resolution images are a plurality of divided images when the ratio of boundary portions in which the pixel values were determined to have continuity relative to all boundary portions is a predetermined value or higher. It is also possible to determine that the plurality of low resolution images are a plurality of divided images when there is even one boundary portion in which the pixel values were determined to have continuity.

Moreover, the determination of the foregoing continuity does not need to be performed when image information showing whether the plurality of low resolution images obtained by dividing the original image are a plurality of divided images, whether the original image is the foregoing single constructed image, and so on, is acquired from the outside. In the foregoing case, whether the plurality of low resolution images are a plurality of divided images (whether the original image is the foregoing single constructed image) may also be determined by using the foregoing image information. The image information, for instance, may be added as metadata to the image.

Subsequently, the read control unit 1014 reads the low resolution images from the frame memory 102 based on the determination result of whether the plurality of low resolution images are a plurality of divided images.

Figures 4A, 4B:
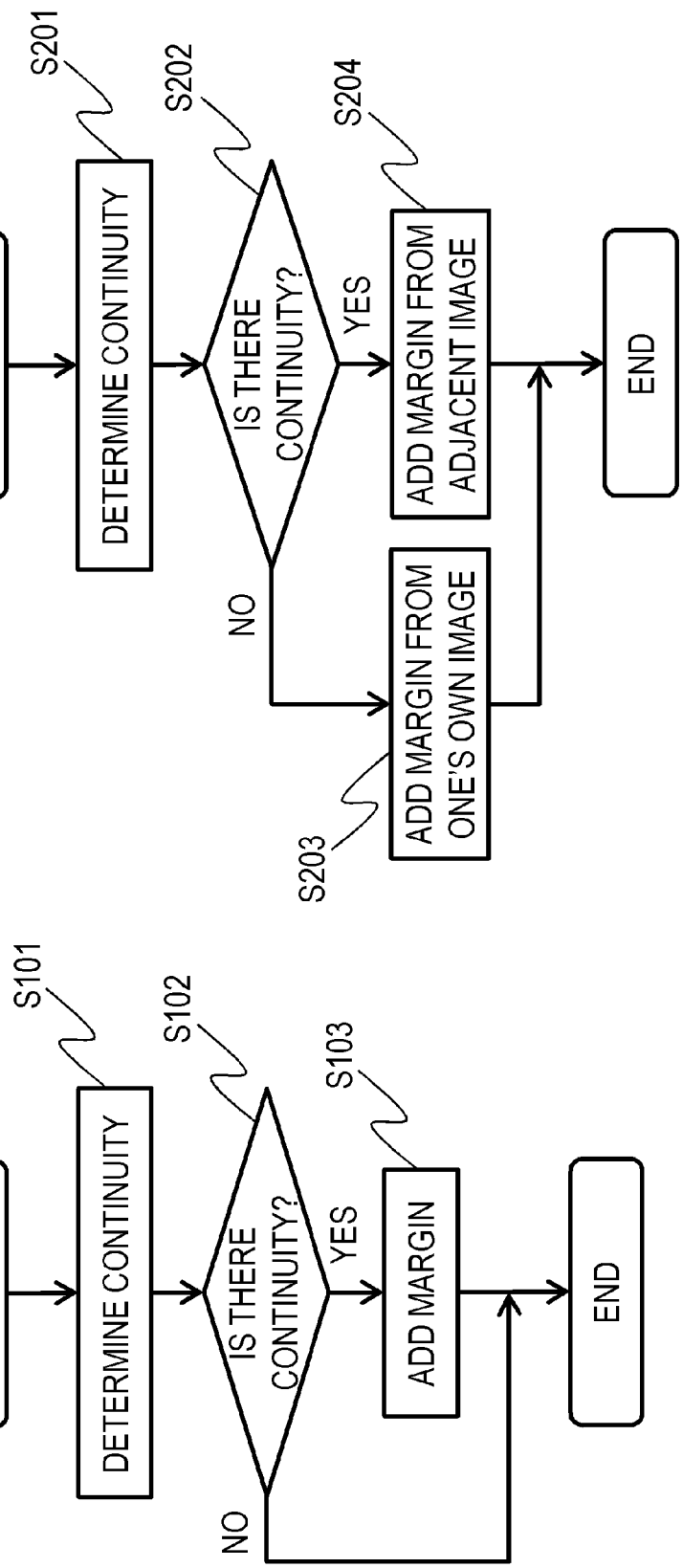
FIGS. 4A and 4B are diagrams showing an example of the processing flow related to the reading of low resolution images according to Embodiment 1.

An example of the processing flow related to the reading of the low resolution images by the read control unit 1014 is shown in the flowchart of FIG. 4A.

Foremost, the boundary analyzing unit 1012 determines whether the pixel values have continuity at each boundary portion of a plurality of low resolution images (S101).

Subsequently, the read control unit 1014 determines whether the pixel values have continuity at all boundary portions (S102).

When it is determined that the pixel values have continuity at all boundary portions (S102: YES), the read control unit 1014 determines that the plurality of low resolution images are a plurality of divided images (that the original image is one single constructed image), and proceeds to the processing of S103. In S103, the read control unit 1014 adds, to an edge portion of each low resolution image, a margin image generated from a low resolution image which is adjacent to that low resolution image in the foregoing single constructed image. Specifically, the plurality of low resolution images to each of which a margin image has been added are read from the frame memory 102.

When there is a boundary portion in which the pixel values were determined as not having continuity (S102: NO), the read control unit 1014 determines that the plurality of low resolution images are not a plurality of divided images (that the plurality of low resolution images are a plurality of independent images; that the original image is a multi constructed image). Subsequently, the read control unit 1014 reads the plurality of low resolution images as is. In other words, the addition of the foregoing margin image is not performed, and the plurality of low resolution images to each of which a margin image has not been added are read.

The plurality of (four) low resolution images (low resolution images to each of which a margin image has been added/low resolution images to each of which a margin image has not been added) that were read are respectively output to the four image processing units 103 to 106.

Subsequently, the image processing units 103 to 106 respectively process in parallel and output the four low resolution images (low resolution images to each of which a margin image has been added/low resolution images to each of which a margin image has not been added) which are output from the input processing unit 101.

In other words, the image processing units 103 to 106 perform image processing on the plurality of low resolution images to each of which a margin image has been added when the plurality of low resolution images are determined to be the plurality of divided images. Moreover, when the plurality of low resolution images are determined to be the plurality of independent images, image processing is performed on the plurality of low resolution images to each of which a margin image generated from another low resolution image has not been added. Specifically, image processing is performed on the plurality of low resolution images to each of which a margin image has not been added.

Note that, when a margin image is added to the low resolution images, image processing may be performed only on the area of the low resolution images, or image processing may be performed on both areas of the low resolution images and the margin image. The configuration of performing image processing only on the area of the low resolution images can reduce the processing load of the image processing.

Subsequently, the synthesizing unit 107 writes the plurality of low resolution images, which were output from the image processing units 103 to 106, in the frame memory 102. In addition, the synthesizing unit 107 reads the low resolution images that were written, and outputs the low resolution images as a synthesized image in which a plurality of low resolution images are arranged (in this embodiment, an image having 3840 pixels in the horizontal direction and 2160 lines in the vertical direction) to the display unit 108. Consequently, the original image is displayed after being subjected to image processing. Note that, when a margin image is added to the low resolution images, the synthesizing unit 107 reads the low resolution images by deleting the added margin image.

Note that, in this embodiment, while the synthesized image is an image in which a plurality of low resolution images are arranged in a predetermined order, the synthesized image is not limited thereto. When the plurality of low resolution images are a plurality of divided images, the synthesized image may also be an image in which a plurality of low resolution images are arranged in a predetermined order (order for forming a correct single constructed image). When the plurality of low resolution images are a plurality of independent images, the synthesized image may also be an image in which a plurality of low resolution images are arranged in a predetermined order, or an image in which a plurality of low resolution images are arranged in random order.

Figure 3C:
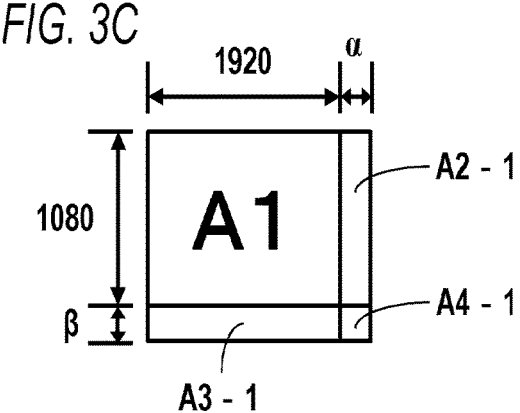

FIG. 3C is a schematic diagram showing a state where a margin image is added to the low resolution image A1.

In the example of FIG. 3C, upon reading the low resolution image A1 having 1920 pixels in the horizontal direction and 1080 lines in the vertical direction from the frame memory 102, an image A2-1, an image A3-1, and an image A4-1 are added as margin images. The image A2-1 is a margin image having a pixels in the horizontal direction and 1080 lines in the vertical direction which is added to the right side of the low resolution image A1. The image A3-1 is a margin having 1920 pixels in the horizontal direction and β lines in the vertical direction which is added to the lower side of the low resolution image A1. The image A4-1 is a margin image having α pixels in the horizontal direction and β lines in the vertical direction which is added to the lower right side of the low resolution image A1. The values of α and β are determined so that the pixels to be used (referred to) upon the processing (for instance, spatial filter processing) of the area of the low resolution images to be performed by the image processing unit are contained. For example, when the processing to be performed by the image processing unit is spatial filter processing, the values of α and β are determined based on the size of the spatial filter. The values of α and β may be set in the read control unit 1014 in advance, or input from the outside (by the user, manufacturer, or the like). In spatial filter processing, the pixel values of the target pixel and neighboring pixels are subjected to weighting according to the pixel position, and the sum thereof (weighed pixel values) is calculated as the new pixel value of the target pixel. Examples of the spatial filter processing include smoothing filter processing for removing noise in the image, edge emphasizing processing for emphasizing the edge in the image, and so on.

Upon reading the low resolution images A2 to A4 from the frame memory 102, margin images generated from the adjacent low resolution image are similarly added.

Note that the pixel values of the margin images are determined by using the pixel values of at least a part of the low resolution images A2 to A4 which are adjacent to the low resolution image A1. For example, the pixel value of the image A2-1 is determined by using the pixel value of the low resolution image A2. The pixel value of the image A3-1 is determined by using the pixel value of the low resolution image A3. The pixel value of the image A4-1 is determined by using the pixel value of the low resolution image A4. Specifically, for each pixel of the margin image, the value of the pixel of another low resolution image corresponding to that pixel is used as the pixel value. For example, an image of the area of cc pixels in the horizontal direction and 1080 lines in the vertical direction adjacent to the low resolution image A1 of the low resolution image A2 is used as the image A2-1.

However, the method of determining the pixel value of the margin image is not limited to the foregoing method.

The pixel value of the margin image may also be determined by using only the value of the pixel that is adjacent to the low resolution image (pixel of the adjacent low resolution image). For example, for each line (each row), the value of the pixel of the low resolution image A2 that is adjacent to the low resolution image A1 in that line may be used as the value of the respective pixels of the image A2-1 of that line. For each column, the value of the pixel of the low resolution image A3 that is adjacent to the low resolution image A1 in that column may be used as the value of the respective pixels of the image A3-1 of that column. In addition, the value of the pixel of the low resolution image A4 that is adjacent to the low resolution image A1 may also be used as the value of the respective pixels of the image A4-1.

Moreover, for each margin image, the representative value (average value, mode value, maximum value, minimum value or the like) of the pixel value of the low resolution image corresponding to that margin image may also be used as the respective pixel values of that margin image. For example, the representative value (average value, mode value, maximum value, minimum value or the like) of the pixel value of the area of α pixels in the horizontal direction and 1080 lines in the vertical direction adjacent to the low resolution image A1 of the low resolution image A2 may be used as the value of the respective pixels of the image A2-1.

When the plurality of low resolution images are a plurality of divided images (when the original image is one single constructed image), if the margin images are not added, the values of the proper pixels (pixels of the other lower resolution images) will not be referred to in the processing performed by the image processing unit, and an appropriate processing result cannot be obtained. In this embodiment, when the plurality of low resolution images are a plurality of divided images, added to an edge portion of each low resolution image is a margin image generated from a low resolution image that is adjacent to that low resolution image. Thus, the values of proper pixels (or corresponding values thereof) are referred to in the processing performed by the image processing unit, and an appropriate processing result can be obtained.

Figure 3D:
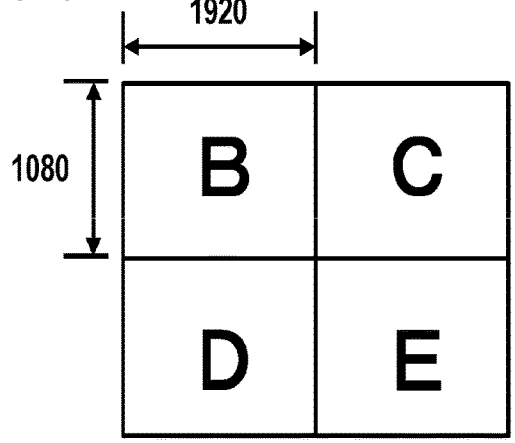
Figure 3E:
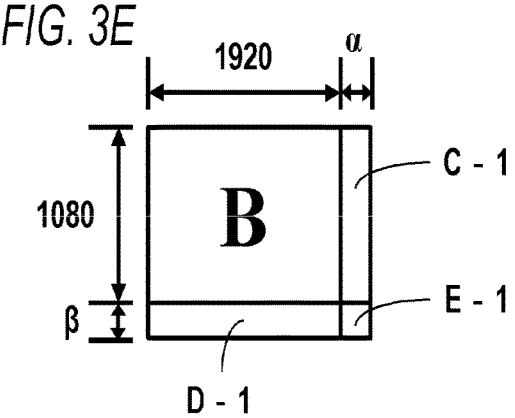

FIG. 3D is a schematic diagram showing an example of a multi constructed image including four independent images B, C, D, and E. The independent images B, C, D, and E respectively correspond to the low resolution images A1, A2, A3, and A4. Moreover, the independent images B, C, D, and E are respectively independent images, and are mutually unrelated. If the same margin images as FIG. 3C are added to the foregoing independent images, totally unrelated images will be added as the margin images to the independent images. For example, as shown in FIG. 3E, margin images C-1, D-1, and E-1 generated from totally unrelated independent image C, D, and E (independent images adjacent to the independent image B) will be added to the edge portions of the independent image B. Consequently, the pixel values of totally unrelated independent images will be referred to in the processing that is performed on one independent image. Thus, it is not possible to obtain an appropriate processing result of the boundary portions (inconsistencies in the image will occur at the boundary portions). In this embodiment, margin images are not added to the low resolution images when the plurality of low resolution images are a plurality of independent images. Thus, the foregoing inconsistencies will not occur, and an appropriate processing result can be obtained.

As described above, according to this embodiment, whether the plurality of low resolution images are a plurality of divided images or a plurality of independent images is determined. In addition, when the plurality of low resolution images are determined to be the plurality of divided images, added to each low resolution image is a margin image that is generated from a low resolution image that is adjacent to that low resolution image. Furthermore, image processing is performed on the low resolution images to each of which the margin image has been added. Moreover, when the plurality of low resolution images are determined to be the plurality of independent images, image processing is performed on the plurality of low resolution images to each of which a margin image generated from another low resolution image has not been added. Specifically, image processing is performed on the plurality of low resolution images to each of which a margin image has not been added.

Consequently, when the plurality of low resolution images are a plurality of divided images, in the processing performed on one low resolution image, it is possible to refer to the pixel value of a low resolution image that is adjacent to that low resolution image. Moreover, when the plurality of low resolution images are a plurality of independent images, in the processing performed on one low resolution image, it is possible to prevent the pixel value of a low resolution image that is unrelated to that low resolution image from being referred to. In addition, it is possible to obtain an appropriate image processing result upon performing image processing on a plurality of low resolution images, and generating a synthesized image in which the plurality of low resolution images having been subjected to the image processing are arranged.

Note that, while this embodiment adopted a configuration where the read control unit determines whether the plurality of low resolution images are a plurality of divided images, other functional units may also perform the foregoing determination. For example, the boundary analyzing unit may also perform the foregoing determination. In addition, a functional unit for performing the foregoing determination may be separately provided to the image processing apparatus.

Note that, while this embodiment adopted a configured where a margin image is not added to the low resolution images when the plurality of low resolution images are determined to be the plurality of independent images, it is also possible to add a margin image even when the plurality of low resolution images are determined to be the plurality of independent images.

FIG. 4B is a diagram showing another example of the processing flow related to the reading of the low resolution images by the read control unit 1014.

The processing of S201, S202, and S204 in FIG. 4B is the same as the processing of S101, S102, and S103 in FIG. 4A.

When there is a boundary portion in which the pixel values were determined as not having continuity (S202: NO), a margin image is added to an edge portion of each low resolution image in S203. Specifically, the plurality of low resolution images to each of which a margin image has been added are read from the frame memory 102. However, the margin image that is added in S203 is an image generated from itself (low resolution image to which that margin image is to be added). In other words, in S203, for each low resolution image, a margin image generated from that low resolution image is added to an edge portion of that low resolution image.

FIGS. 5A and 5B are schematic diagrams showing an example of the state where a margin image is added to the low resolution image (independent image) in S203. FIGS. 5A and 5B show a state where a margin image having 16 pixels in the horizontal direction is added to first line of the independent image B of FIG. 3D.

FIG. 5A is a diagram showing an example of determining the pixel value of the margin image to be added to the low resolution image by using only the value of the pixel positioned at the edge portion of that low resolution image. Specifically, in FIG. 5A, the value (B1919) of the pixel on the rightmost side of the first line of the independent image B is used as the value of the respective pixels of the first line of the margin image that is added to the right side of the independent image B.

FIG. 5B is a diagram showing an example where the margin image to be added to the low resolution image is generated by inverting the image of the edge portion part of the low resolution image (image within a predetermined range from the edge portion) relative to that edge portion. In FIG. 5B, an image in which the 16 pixels of the right side edge portion of the first line of the independent image B are inverted with the right side edge portion of the independent image B as the reference is used as the margin image to be added to the right side of the first line of the independent image B.

Accordingly, by adding a margin image to each low resolution image regardless of whether the plurality of low resolution images are a plurality of divided images, the size of the image to be processed can be unified in the subsequent processing to be performed by the input processing unit 101. Moreover, when the plurality of low resolution images are a plurality of independent images, a margin image generated from the low resolution image is added to that low resolution image. In other words, when the plurality of low resolution images are a plurality of independent images, an image related to the low resolution image is added as the margin image to that low resolution image. Thus, even if a margin image is added when the plurality of low resolution images are a plurality of independent images, the foregoing inconsistencies will not occur, and an appropriate processing result can be obtained.

<Embodiment 2>

Embodiment 1 explained a configuration where the original image is divided into a plurality of low resolution images, and the plurality of low resolution images are subjected to image processing and synthesized. This embodiment explains a configuration where a plurality of low resolution images are input, and the plurality of input low resolution images are subjected to image processing and synthesized.

Figure 6:
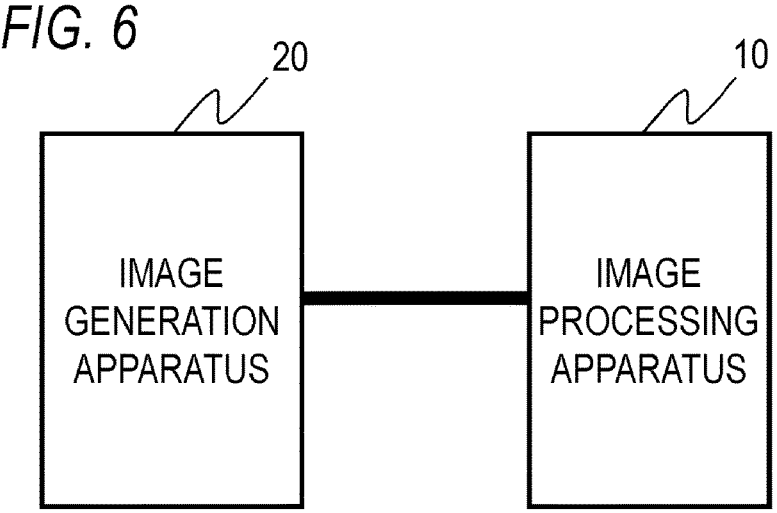
FIG. 6 is a diagram showing an example of the configuration of the image processing system according to Embodiment 2.

FIG. 6 is a block diagram showing an example of the configuration of the image processing system according to this embodiment.

As shown in FIG. 6, the image processing system according to this embodiment includes an image processing apparatus 10 and an image generation apparatus 20.

The image processing apparatus 10 generates one synthesized image by performing image processing on and synthesizing the plurality of input low resolution images. In addition, the image processing apparatus 10 displays the synthesized image on the display unit.

The image generation apparatus 20 divides the one original image into a plurality of low resolution images, and outputs the low resolution images to the image processing apparatus 10.

Figure 7:
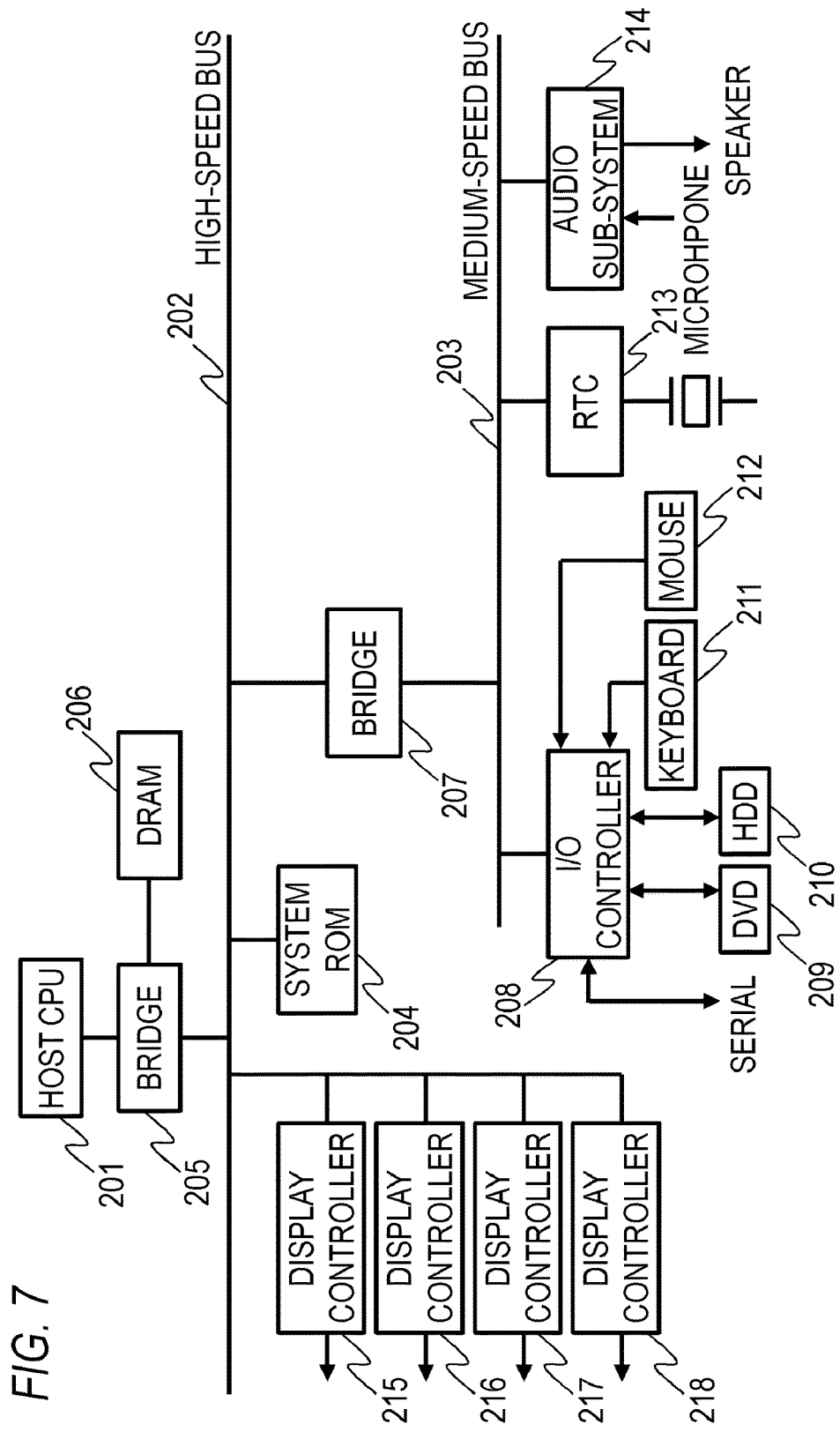
FIG. 7 is a diagram showing an example of the functional configuration of the image generation apparatus according to Embodiment 2.

FIG. 7 is a block diagram showing an example of the functional configuration of the image generation apparatus 20 according to this embodiment. As shown in FIG. 7, the image generation apparatus 20 includes a host CPU 201, a high-speed bus 202, a medium-speed bus 203, a system. ROM 204, and bridges 205 and 207. Moreover, the image generation apparatus 20 includes a DRAM 206, an I/O controller 208, a DVD device 209, an HDD device 210, a keyboard 211, a mouse 212, an RTC 213, an audio subsystem 214, and display controllers 215 to 218.

The host central processing unit (CPU) 201 controls the overall image generation apparatus.

The high-speed bus 202 is a peripheral component interconnect (PCI) express or the like comprising an address bus, a data bus, a control bus, and so on.

The bridge 205 acts as an interface between the host CPU 201 and the high-speed bus 202.

The dynamic random access memory (DRAM) 206 is used as a main memory. Specifically, the DRAM 206 stores the control programs to be executed by the host CPU 201. Moreover, the DRAM 206 is used as the work area upon the host CPU 201 performing control processing.

The medium-speed bus 203 is a Serial advanced technology attachment (ATA) or the like.

The bridge 207 connects the high-speed bus 202 and the medium-speed bus 203.

The system read only memory (ROM) 204 stores programs and the like for performing the initializing processing of the overall apparatus.

The display controllers 215 to 218 generate images. Specifically, one display controller can generate a low generation image having, at maximum, 1920 pixels in the horizontal direction and 1080 lines in the vertical direction. In this embodiment, four display controllers are used to generate an original image having, at maximum, 3840 pixels in the horizontal direction and 2160 lines in the vertical direction. Specifically, it is possible to generate four low resolution images obtained by dividing the original image having 3840 pixels in the horizontal direction and 2160 lines in the vertical direction.

In this embodiment, display information (size of the low resolution images generated by the display controllers, region of the low resolution images in the original image, and so on) is set from the host CPU 201 to the display controllers 215 to 218 via the high-speed bus 202. Output from the display controllers 215 to 218 are the four divided images (low resolution images A1 to A4) as shown in FIG. 3B, or the four independent images as shown in FIG. 3D.

The I/O controller 208 includes a disk interface for the digital video disc (DVD) device 209 and the hard disk drive (HDD) device 210. Moreover, the I/O controller 208 includes a serial interface for use in communication with outside devices, and an interface with the keyboard 211 for inputting text, numbers, and so on or the mouse 212 as a pointing device.

The RTC 213 is a real time clock, and includes a timer function of counting the clock and timing the time.

The audio sub-system 214 outputs, to the medium-speed bus 203, the audio signal that was input from a microphone, or outputs an audible signal to a speaker based on a signal from the medium-speed bus 203.

The user generally operates the image generation apparatus 20 while confirming the various types of information displayed on the display unit of the image processing apparatus 10 (display unit connected to the image display device).

Specifically, images (images of text, photographs, TV programs or the like) supplied from the DVD device 209, the HDD device 210, the keyboard 211, the mouse 212 and the like are output from the image generation apparatus 20 to the image processing apparatus 10 via the display controllers 215 to 218. Moreover, operational information and the like pertaining to the user's system operation stored in the system ROM 204 and the main memory (DRAM) 206 are also output from the image generation apparatus 20 to the image processing apparatus 10 via the display controllers 215 to 218.

In addition, the user edits various types of information or performs operations for giving instructions to the system while confirming the contents displayed on the display unit of the image processing apparatus 10.

Figure 8:
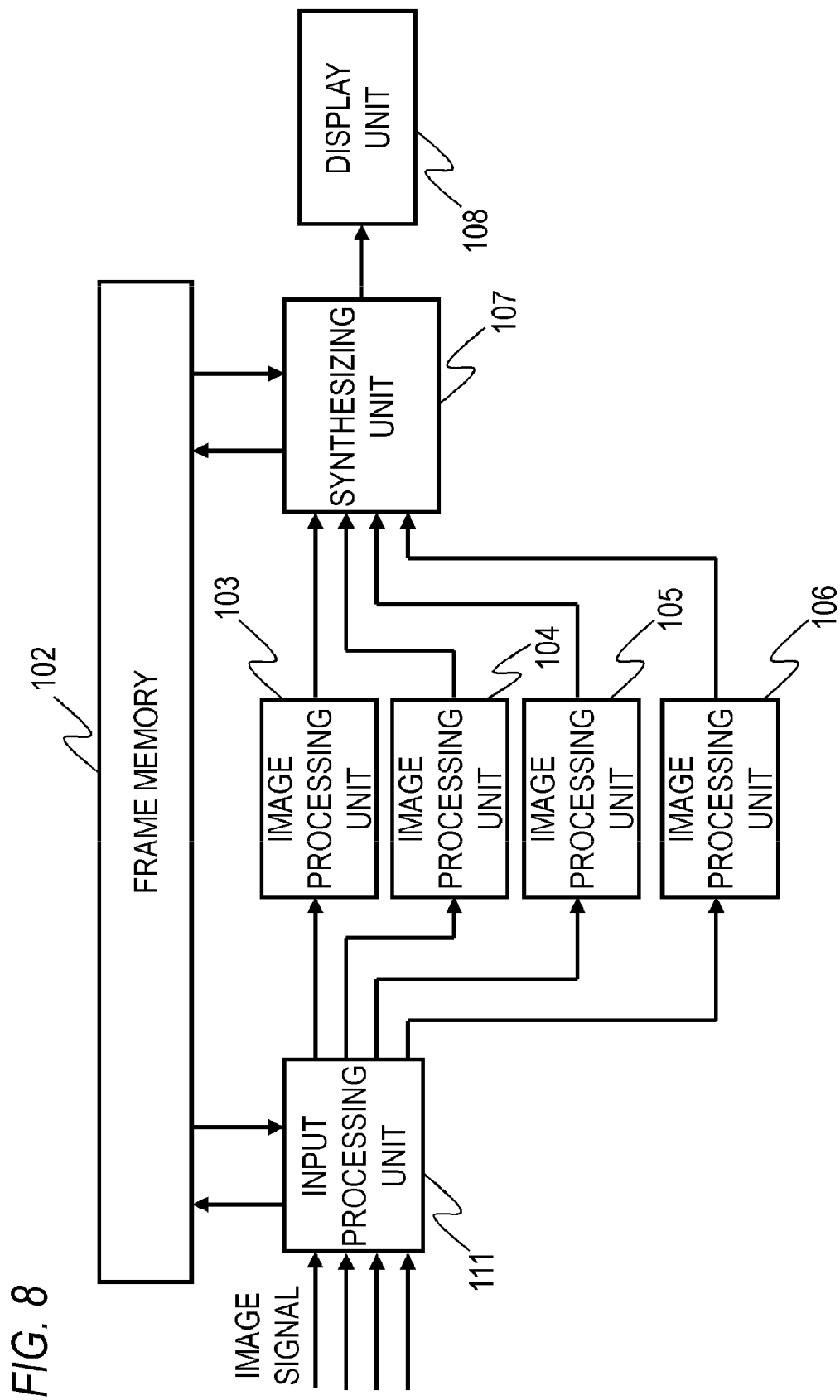
FIG. 8 is a diagram showing an example of the functional configuration of the image processing apparatus according to Embodiment 2.

FIG. 8 is a block diagram showing an example of the functional configuration of the image processing apparatus 10 according to this embodiment. As shown in FIG. 8, the image processing apparatus 10 includes an input processing unit 111, a frame memory 102, image processing units 103 to 106, a synthesizing unit 107, and a display unit 108.

The input processing unit 111 writes the plurality of low resolution images that were output from the image generation apparatus 20 in the frame memory 102. In addition, the input processing unit 111 reads the plurality of low resolution images that were written in the frame memory 102, and outputs the read low resolution images to the image processing units 103 to 106. Details regarding the input processing unit 111 will be explained later.

The frame memory 102, the image processing units 103 to 106, the synthesizing unit 107, and the display unit 108 are the same as those shown in FIG. 1 of Embodiment 1.

Figure 9:
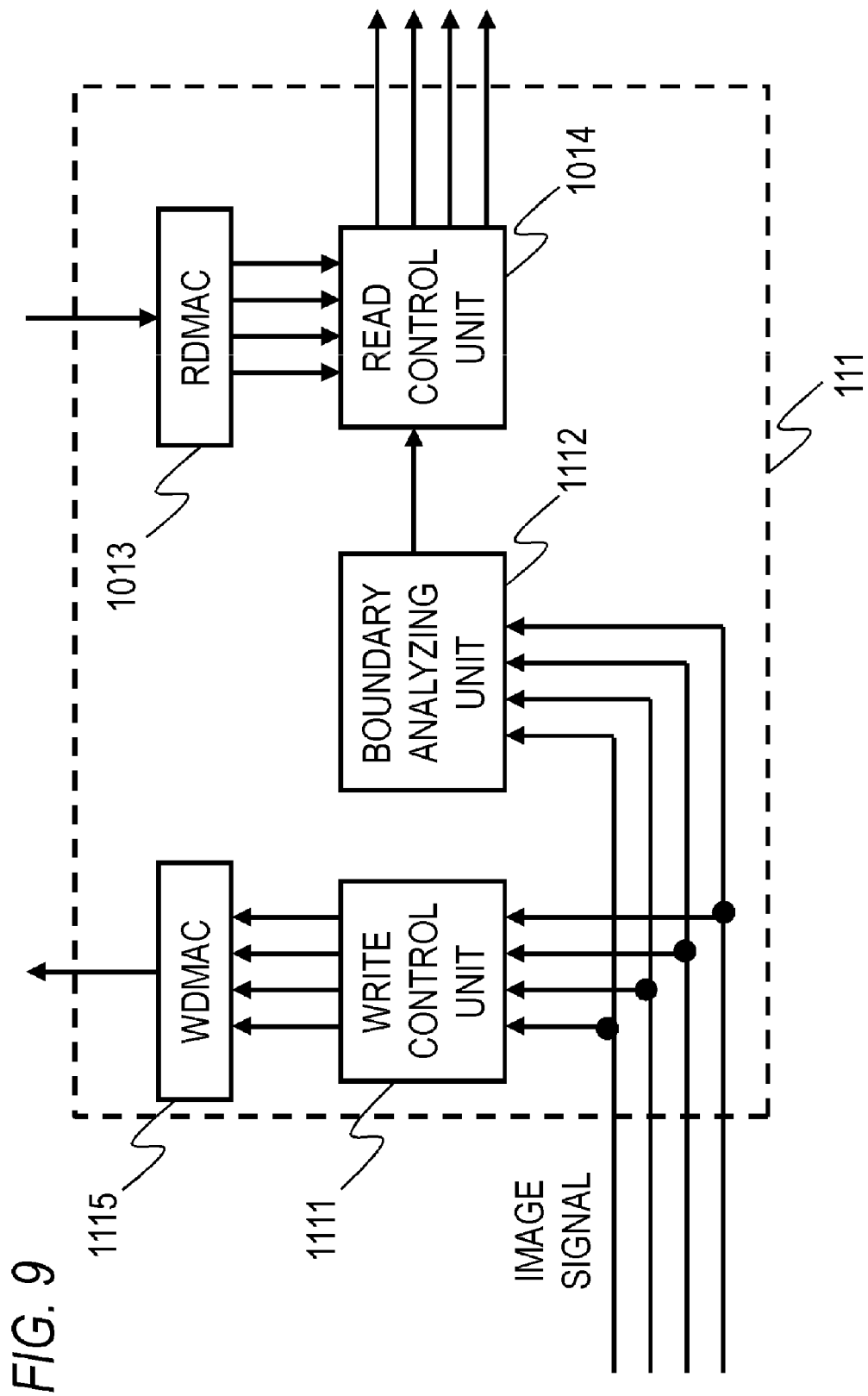
FIG. 9 is a diagram showing an example of the functional configuration of the input processing unit according to Embodiment 2.

FIG. 9 is a block diagram showing an example of the functional configuration of the input processing unit 111. As shown in FIG. 9, the input processing unit 111 includes a write control unit 1111, a write direct memory access controller (WDMAC) 1115, a boundary analyzing unit 1112, an RDMAC 1013, a read control unit 1014, and so on.

The write control unit 1111 controls the writing of the plurality of input low resolution images in the frame memory 102.

The WDMAC 1115 adjusts the four types of write requests from the write control unit 1111, and controls the writing of the plurality of low resolution images in the frame memory 102.

The boundary analyzing unit 1112 determines, for each boundary portion of the plurality of input low resolution images, whether the pixel values at that boundary portion has continuity, and outputs the determination result to the read control unit 1014.

The RDMAC 1013 and the read control unit 1014 are the same as those shown in FIG. 2 of Embodiment 1.

A specific example of the operation of the image processing apparatus according to this embodiment is now explained in detail.

Foremost, the write control unit 1111 writes the four low resolution images that are output from the image generation apparatus 20 in the frame memory 102 via the WDMAC 1115.

Subsequently, as with Embodiment 1, the boundary analyzing unit 1112 determines, for each boundary of the four low resolution images that are output from the image generation apparatus 20, whether the pixel values at that boundary portion has continuity.

In addition, as with Embodiment 1, the read control unit 1014 determines whether the plurality of low resolution images are a plurality of divided images based on the foregoing determination result of continuity.

Subsequently, as with Embodiment 1 (according to the processing flow shown in FIG. 4A or FIG. 4B), the read control unit 1014 reads the low resolution images from the frame memory 102 based on the determination result of whether the plurality of low resolution images are a plurality of divided images. The plurality of low resolution images that were read are respectively output to the four image processing units 103 to 106 as with Embodiment 1.

Subsequently, as with Embodiment 1, the image processing units 103 to 106 process in parallel and output the four low resolution images that were output from the input processing unit 101.

Subsequently, as with Embodiment 1, the synthesizing unit 107 writes, in the frame memory 102, the plurality of low resolution images that are output from the image processing units 103 to 106. Further, as with Embodiment 1, the synthesizing unit 107 reads the written low resolution images, and outputs the low resolution images as a synthesized image in which a plurality of low resolution images are arranged to the display unit 108. Consequently, the original image is displayed after being subjected to image processing.

As described above, according to this embodiment, image processing is performed on the plurality of low resolution images as with Embodiment 1 even in cases where a plurality of low resolution images are input to the image processing apparatus. In addition, a synthesized image in which the plurality of low resolution images having been subjected to the image processing are arranged is generated and displayed. It is thereby possible to yield the same results as Embodiment 1.

Note that, by further using a frame synchronizing signal (vertical synchronous signal; VS signal) included in the plurality of low resolution images, it is possible to determined whether the plurality of low resolution images are a plurality of divided images with greater accuracy.

Figure 10:
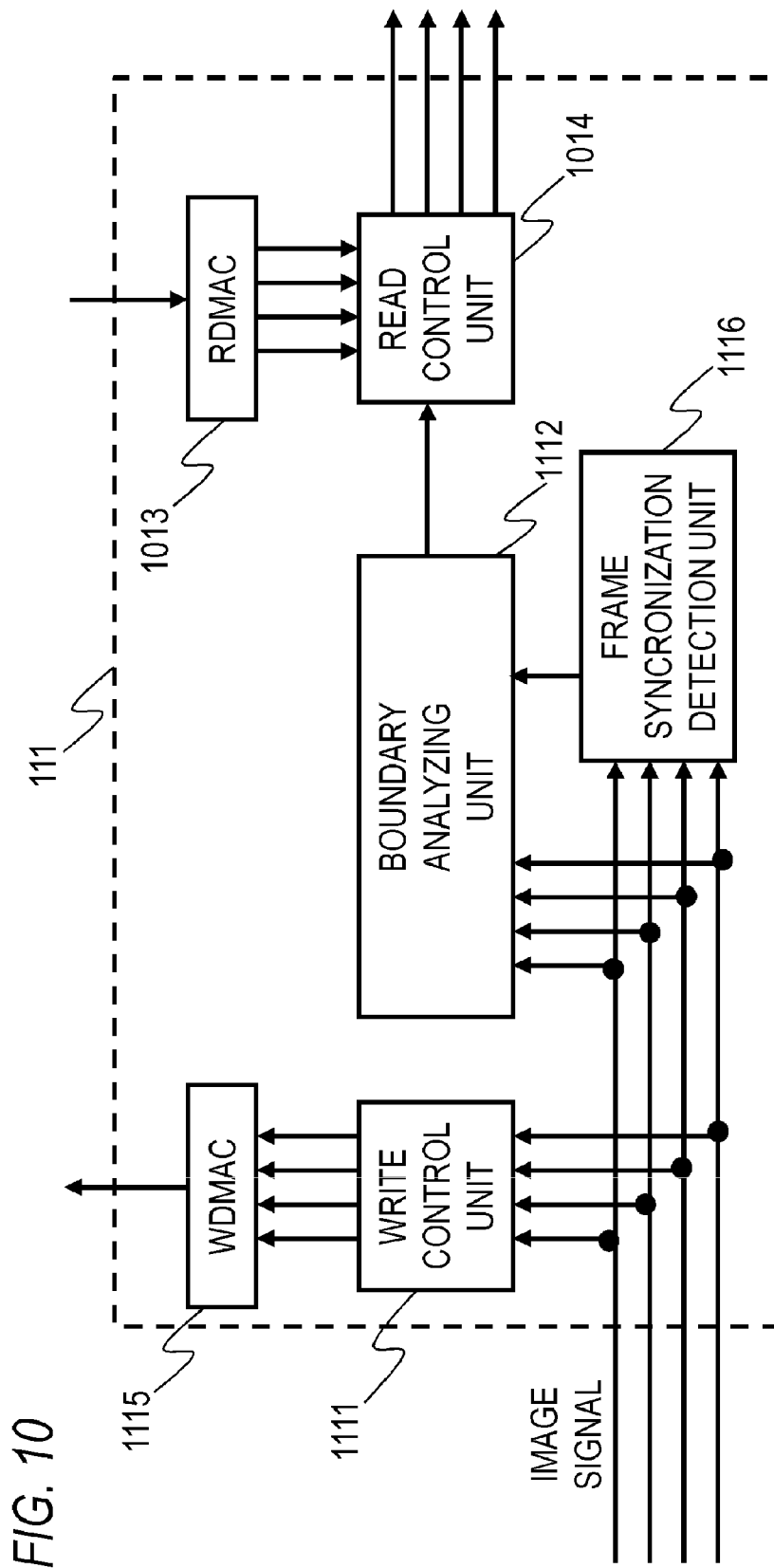
FIG. 10 is a diagram showing an example of the functional configuration of the input processing unit according to Embodiment 2.

FIG. 10 is a block diagram showing another example of the functional configuration of the input processing unit 111 according to this embodiment. In the example of FIG. 10, the input processing unit 111 includes a write control unit 1111, a WDMAC 1115, a boundary analyzing unit 1112, an RDMAC 1013, a read control unit 1014, a frame synchronization detection unit 1116, and so on.

The write control unit 1111, the WDMAC 1115, and the RDMAC 1013 are the same as those shown in FIG. 9.

The frame synchronization detection unit 1116 determines whether the frame synchronizing signals of the plurality of low resolution images are synchronized, and outputs the determination result to the boundary analyzing unit 1112. Specifically, the frame synchronization detection unit 1116 analyzes the VS signals contained in the four types of low resolution images output from the image generation apparatus 20 (S301 of FIG. 11A), and determines whether all VS signals are mutually synchronized. Subsequently, when it is determined that the VS signals of the four low resolution images are synchronized (S302: YES), the frame synchronization detection unit 1116 outputs, as the determination result, Sync Flag signal "1" to the boundary analyzing unit 1112 (S303). Moreover, when it is determined that the VS signals of the four low resolution images are not synchronized (S302: NO), the frame synchronization detection unit 1116 outputs Sync Flag signal "0" to the boundary analyzing unit 1112 (S304). FIG. 11A is a flowchart showing an example of the operation of the frame synchronization detection unit 1116.

As with the boundary analyzing unit 1112 of FIG. 9, the boundary analyzing unit 1112 determines whether the pixel values have continuity at each boundary portion of the plurality of low resolution images. Subsequently, the boundary analyzing unit 1112 outputs, to the read control unit 1014, the determination result of the continuity of the pixel values and the Sync Flag signal from the frame synchronization detection unit 1116.

The read control unit 1014 determines whether the plurality of low resolution images (four types of low resolution images output from the image generation apparatus 20) are a plurality of divided images based on the determination result of the continuity of the pixel values and the status of the Sync Flag signal from the frame synchronization detection unit 1116.

Figure 11B:
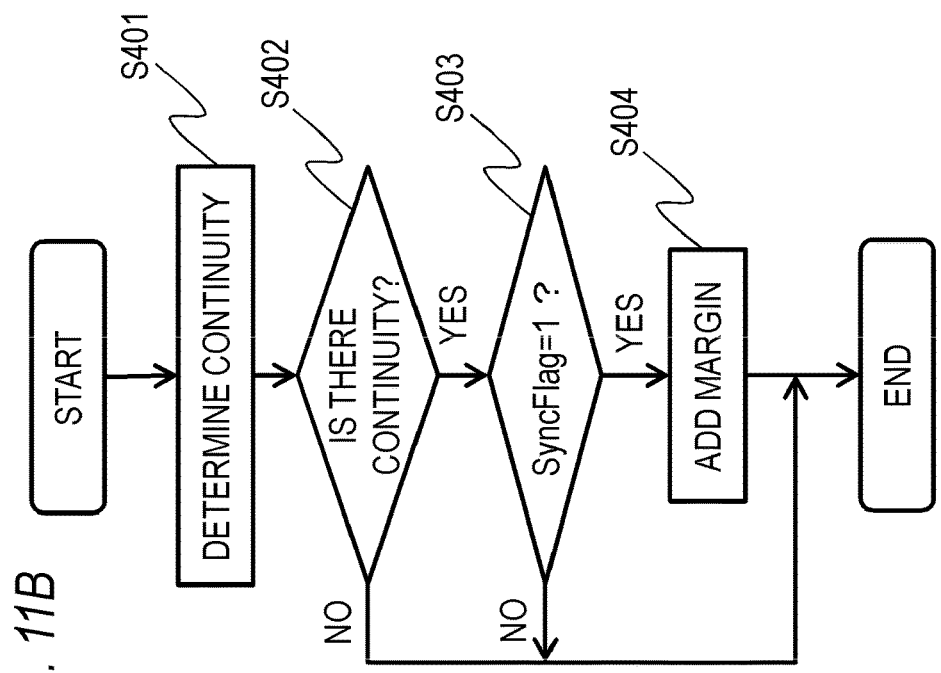
FIGS. 11A and 11B are diagrams showing an example of the processing flow of the input processing unit according to Embodiment 2.
Figure 11A:
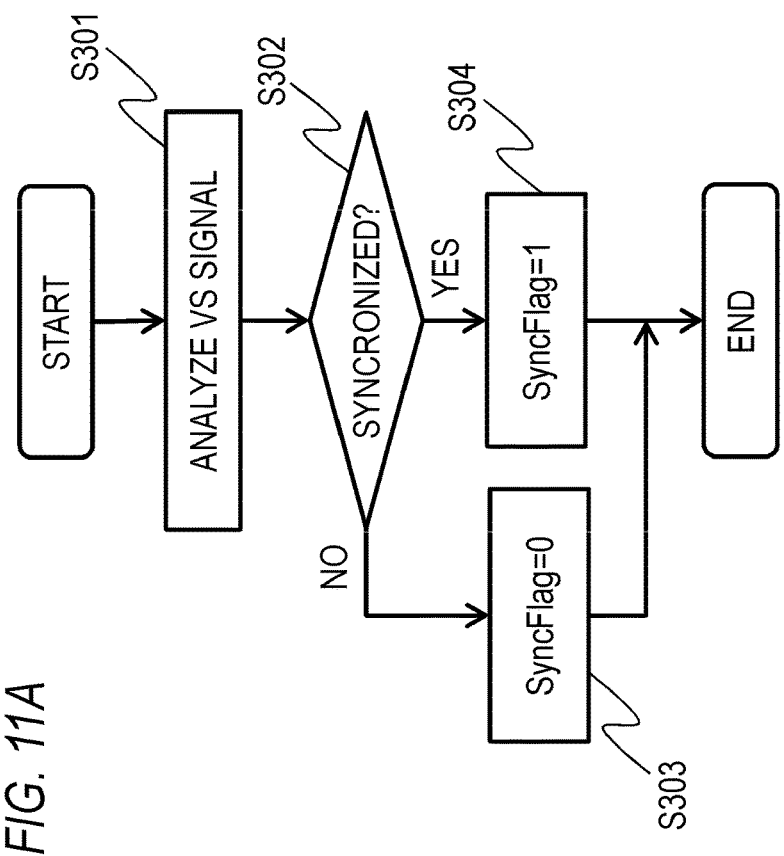

FIG. 11B is a flowchart showing an example of the processing flow related to the reading of the low resolution image by the read control unit 1014 of FIG. 10.

Foremost, the boundary analyzing unit 1112 determines whether the pixel values have continuity at each boundary portion of the plurality of low resolution images (S401).

Subsequently, the read control unit 1014 determines whether the pixel values have continuity at all boundary portions (S402).

When it is determined that the pixel values have continuity at all boundary portions (S402: YES), the read control unit 1014 determines whether the Sync Flag signal is "1" (S403).

When the Sync Flag signal is "1" (S403: YES), the read control unit 1014 determines that the plurality of low resolution images are a plurality of divided images, adds a margin image to and reads the plurality of low resolution images (S404).

When the Sync Flag signal is "0" (S403: NO), the read control unit 1014 determines that the plurality of low resolution images are a plurality of independent images, and reads the plurality of low resolution images without adding a margin image. Note that, a margin image is also not added when it is determined in S402 that there is a boundary portion in which the pixel values are determined as not having continuity. Note that, when the plurality of low resolution images are determined to be the plurality of independent images, it is also possible to add, to each low resolution image, a margin image which is generated from that low resolution image as shown in FIG. 4B.

When the plurality of low resolution images are a plurality of divided images, the frame synchronizing signals of the plurality of low resolution images possess a specific phase relationship (are synchronized). Thus, when the frame synchronizing signals of the plurality of low resolution images are synchronized, it is highly likely that such plurality of low resolution images are a plurality of divided images. Moreover, when the frame synchronizing signals of the plurality of low resolution images are not synchronized, it is highly likely that such plurality of low resolution images are a plurality of independent images.

According to the foregoing configuration, whether the frame synchronizing signals of the plurality of low resolution images are synchronized is determined. In addition, when the frame synchronizing signals of the plurality of low resolution images are not synchronized, it is determined that the plurality of low resolution images are a plurality of independent images.

Consequently, whether the plurality of low resolution images are a plurality of divided images can be determined with greater accuracy in comparison to the case of determining whether the plurality of low resolution images are a plurality of divided images based on only the determination result of the continuity of the pixel values. For example, even in cases where the plurality of low resolution images are determined to be the plurality of divided images based only on the determination result of the continuity of the pixel values, if the frame synchronizing signals of the plurality of low resolution images are not synchronized, it is highly likely that the plurality of low resolution images are a plurality of independent images. According to the foregoing configuration, it is possible to determine the plurality of low resolution images to be the plurality of independent images even in the foregoing case.

Note that this kind of configuration (determination based on frame synchronizing signals) can also be applied to the configuration of Embodiment 1.

<Embodiment 3>

Embodiments 1 and 2 explained an example where the image processing apparatus determines whether the pixels values have continuity at each boundary portion of the plurality of low resolution images, and controls the processing (addition of margin images) of the boundary portions according to the determination result.

This embodiment explains a case where the image processing apparatus acquires information showing at least whether the plurality of low resolution images are a plurality of divided images or a plurality of independent images, and controls the processing (addition of margin images) of the boundary portions according to the acquired information.

As with FIG. 6, the image processing system according to this embodiment includes an image processing apparatus 10 and an image generation apparatus 20. The image generation apparatus 20 is configured the same as in Embodiment 2 (FIG. 7). In this embodiment, a serial interface from the I/O controller 208 is connected to the image processing apparatus 10.

Figure 12:
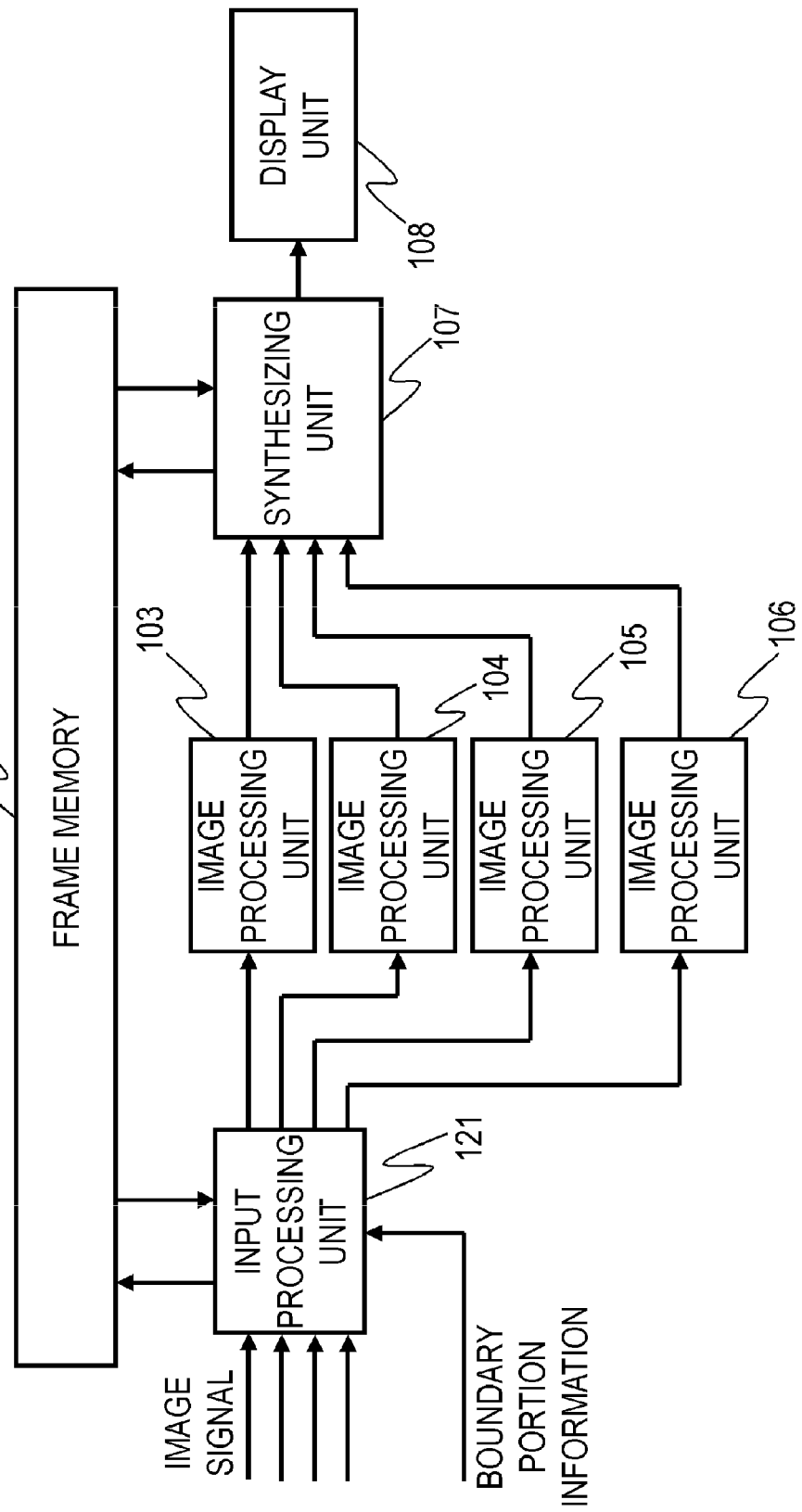
FIG. 12 is a diagram showing an example of the functional configuration of the image processing apparatus according to Embodiment 3.

FIG. 12 is a block diagram showing an example of the functional configuration of the image processing apparatus 10 according to this embodiment. As shown in FIG. 12, the image processing apparatus 10 includes an input processing unit 121, a frame memory 102, image processing units 103 to 106, a synthesizing unit 107, a display unit 108, and so on.

The input processing unit 121 writes, in the frame memory 102, the plurality of low resolution images that were output from the image generation apparatus 20. In addition, the input processing unit 121 reads the plurality of low resolution images that were written in the frame memory 102, and outputs the read low resolution images to the image processing units 103 to 106. Furthermore, the input processing unit 121 includes a function for communicating with the image generation apparatus 20 via the serial interface. Note that the method of communicating with the outside (image generation apparatus 20 in this embodiment) may also be a method that does not use the serial interface.

The frame memory 102, the image processing units 103 to 106, the synthesizing unit 107, and the display unit 108 are the same as those shown in FIG. 1 of Embodiment 1.

FIG. 13 is a block diagram showing an example of the functional configuration of the input processing unit 121. As shown in FIG. 13, the input processing unit 111 includes a write control unit 1111, a WDMAC 1115, a read control unit 1014, an RDMAC 1013, a communication control unit 1217, and so on.

The write control unit 1111, the WDMAC 1115, the read control unit 1014, and the RDMAC 1013 are the same as those shown in FIG. 9.

The communication control unit 1217 communicates with the image generation apparatus 20 via the serial interface.

In this embodiment, the communication control unit 1217 acquires, from the image generation apparatus 20, information (image information) showing at least whether the plurality of low resolution images are a plurality of divided images or a plurality of independent images. Specifically, the communication control unit 1217 acquires, from the image generation apparatus 20, as image information, boundary portion information showing whether the pixel values at each boundary portion have continuity. In this embodiment, the plurality of low resolution images are determined to be the plurality of divided images when the pixel values at all boundary portions have continuity. Thus, when the boundary portion information shows that the pixel values at all boundary portions have continuity, it can be said that the foregoing boundary portion information is information which shows that the plurality of low resolution images are a plurality of divided images.

An example of the operation of the image processing system according to this embodiment is now explained in detail. Note that the remaining operations other than the operation explained below are the same as the operations in Embodiments 1 and 2.

Foremost, in the image generation apparatus 20, the host CPU 201 sets the display information to the display controllers 215 to 218 via the high-speed bus 202. Moreover, the host CPU 201 sets the serial communication to the I/O controller 208 via the medium-speed bus 203. Specifically, the host CPU 201 sends, to the I/O controller 208, image information showing at least whether the plurality of (four) low resolution images output from the display controllers 215 to 218 are a plurality of divided images or a plurality of independent images.

The I/O controller 208 sends to the image processing apparatus 10, via the serial interface, the image information (boundary portion information in this embodiment) that was sent from the host CPU 201.

The communication control unit 1217 acquires the boundary portion information sent from the image generation apparatus 20, and outputs the acquired boundary portion information to the read control unit 1014.

The read control unit 1014 determines whether the plurality of low resolution images are a plurality of divided images or a plurality of independent images by using the boundary portion information that was output from the communication control unit 1217. Subsequently, the read control unit 1014 reads the plurality of low resolution images from the frame memory 102 according to the determination result.

Figure 14A:
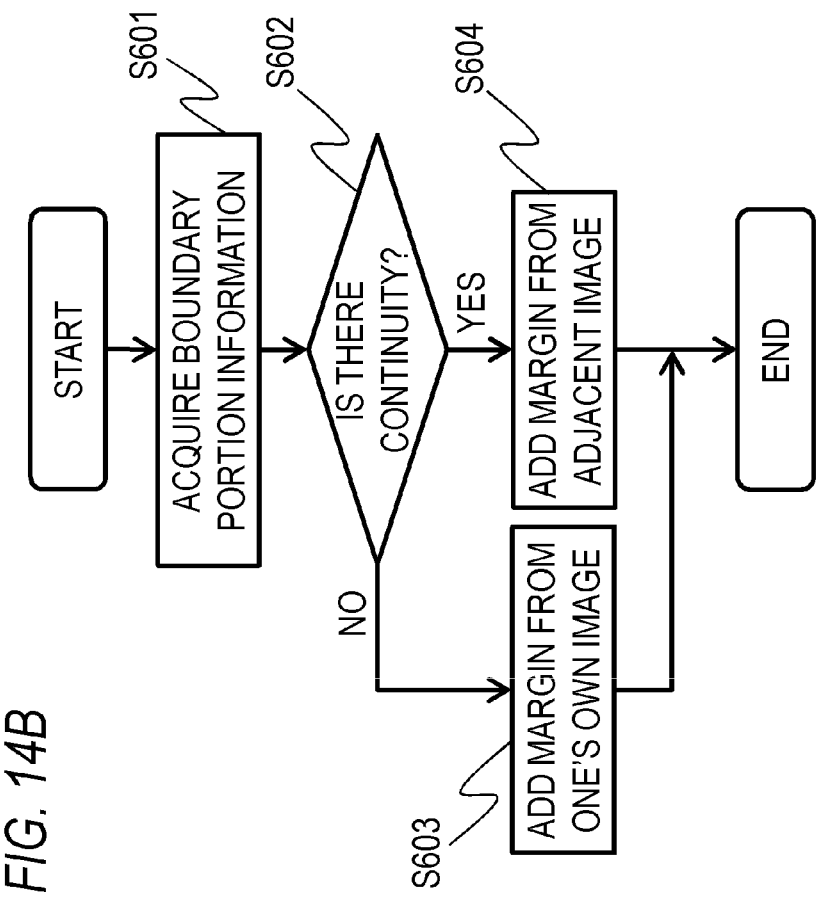
FIGS. 14A and 14B are diagram showing an example of the processing flow related to the reading of low resolution images according to Embodiment 3.
Figure 14B:
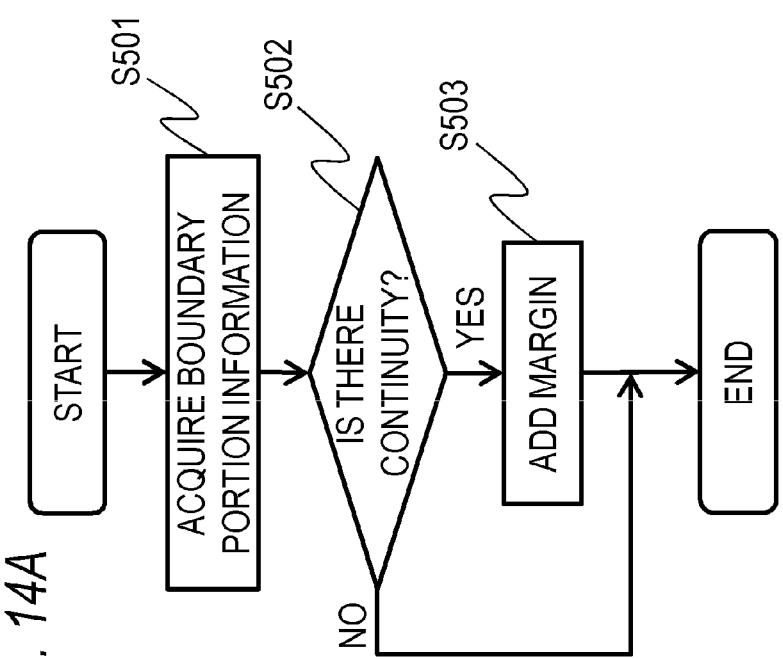

FIGS. 14A and 14B are flowcharts showing an example of the processing flow related to the reading of the low resolution images by the read control unit 1014 of FIG. 13.

Foremost, in S501 and S601 of FIGS. 14A and 14B, the read control unit 1014 acquires the boundary portion information via the communication control unit 1217.

Subsequently, in S502 and S602, the read control unit 1014 determines whether the pixel values at all boundary portions have continuity based on the acquired boundary portion information.

Since the processing of S503, S603, and S604 is the same as the processing of S103, S203, and S204, respectively, the explanation thereof is omitted.

As described above, according to this embodiment, image information showing at least whether the plurality of low resolution images are a plurality of divided images or a plurality of independent images is input to the image processing apparatus from the outside. In addition, whether the plurality of low resolution images are a plurality of divided images or a plurality of independent images is determined by using the foregoing image information. Consequently, it is possible to omit the determination of continuity and the like explained in Embodiments 1 and 2, and reduce the processing load of the image processing apparatus.

Note that, in this embodiment, while boundary portion information showing the continuity of the pixel values at the boundary portions was acquired as the image information, the image information is not limited thereto. The image information may also be information which directly shows whether the plurality of low resolution images input to the image processing apparatus are a plurality of divided images. Moreover, when one image is input as in Embodiment 1, the image information may also be information showing whether the original image is a single constructed image or a multi constructed image.

Note that, while this embodiment adopted a configuration where the image information is input from the image generation apparatus to the image processing apparatus, the configuration is not limited thereto. The image information may also be input from an apparatus that is different from the image generation apparatus, or input by a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-191904, filed on Sep. 2, 2011, and Japanese Patent Application No. 2012-168674, filed on Jul. 30, 2012, which are hereby incorporated by reference herein in their entirety.

What is claimed is:

1. An image display apparatus, comprising;
a CPU configured to perform functions of at least one of an input unit, a determination unit, a margin adding unit, a plurality of image processing units, and a synthesizing unit;
the input unit that inputs, from external image output apparatus, a plurality of input images to an edge of each of which a margin image has not been added;
the determination unit that determines whether the plurality of input images are a plurality of divided images obtained by dividing one original image, or a plurality of independent images which are respectively independent;
the margin adding unit that (i) adds a first margin image to an edge of a first input image of the plurality of input images, and adds a second margin image to an edge of a second input image that is an input image adjacent to the first input image in the original image, in a case where the plurality of input images are determined by the determination unit to be the plurality of divided images, and (ii) does not add the first margin image to the first input image, and does not add the second margin image to the second input image, in a case where the plurality of input images are determined by the determination unit to be the plurality of independent images;
the plurality of image processing units that perform an image processing on the plurality of input images;
the synthesizing unit that synthesizes the plurality of input images on which the image processing has been performed by the plurality of image processing units; and
a display unit that displays the plurality of input images synthesized by the synthesizing unit, wherein
in a case where the plurality of input images are determined by the determination unit to be the plurality of divided images, the first margin image is generated from an edge portion of the second input image, the second margin image is generated from an edge portion of the first input image,
the image processing includes spatial filter processing in which a pixel value of a target pixel is rewritten to a value generated by weighting and synthesizing the pixel value of the target pixel and pixel values of neighboring pixels with weights according to their pixel positions,
(i) in case where the plurality of input images are determined by the determination unit to be the plurality of divided images,
a first image processing unit of the plurality of image processing units performs the image processing on the first input image to which the first margin image has been added, and
a second image processing unit of the plurality of image processing units performs the image processing on the second input image to which the second margin image has been added, and wherein
(ii) in a case where the plurality of input images are determined by the determination unit to be the plurality of independent images,
the first image processing unit performs the image processing on the first input image to which the first margin image has not been added, and
the second image processing unit performs the image processing on the second input image to which the second margin image has not been added.

2. The image display apparatus according to claim 1, wherein the determination unit determines, for each boundary portion between the input images upon arranging the plurality of input images in a predetermined arrangement, whether a change in a pixel value between the input images is continuous, and determines whether the plurality of input images are the plurality of divided images or the plurality of independent images based on a determination result.

3. The image display apparatus according to claim 1, wherein each of the plurality of image processing units performs the image processing on the input age to which any margin image has not been added in a case where the plurality of input usages are determined by the determination unit to be the plurality of independent images.

4. The image display apparatus according to claim 1, wherein in a case where the plurality of input images are determined by the determination unit to be the plurality of independent images, the margin adding unit
generates a margin image from an edge portion of one input image of the plurality of input images, and
adds the margin image to an edge of the one input image.

5. The image display apparatus according to claim 1, wherein the determination unit determines whether frame synchronizing signals of the plurality of input images are synchronized, and determines that the plurality of input images are the plurality of independent images in a case where the frame synchronizing signals of the plurality of input images are not synchronized.

6. The image display apparatus according to claim 1, further comprising:
an acquisition unit that acquires, from the external image output apparatus, information regarding whether the plurality of input images are the plurality of divided images or the plurality of independent images, wherein
the determination unit determines whether the plurality of input images are the plurality of divided images or the plurality of independent images by using the information acquired by the acquisition unit.

7. The image display apparatus according to claim 1,
wherein in a case where, by the plurality of image processing units, the image processing is performed on the plurality of input images to each of which the margin image has been added, the synthesizing unit deletes the margin images which have been added to the plurality of input images, and synthesizes the plurality of input images from each of which the margin image has been deleted.

8. A method of controlling an image display apparatus, comprising:
an input step of inputting, from external image output apparatus, a plurality of input images to an edge of each of which a margin image has not been added;
a determination of determining whether the plurality of input images are a plurality of divided images obtained by dividing one original image, or a plurality of independent images which are respectively independent;
a margin adding step of adding a margin image to the input image, wherein (i) a first margin image is added to an edge of a first input image of the plurality of input images, and a second margin image is added to an edge of a second input image that is an input image adjacent to the first input image in the original image, in a case where the plurality of input images are determined in the determination step to be the plurality of divided images, and (ii) the first margin image added to the first input image, and the second margin image is not added to the second input image, in a case where the plurality of input images are determined in the determination step to be the plurality of independent images;
an image processing step of performing, by using a plurality of image processing units, an image processing on the plurality of input images;
a synthesizing step of synthesizing the plurality of input images on which the image processing has been performed in the image processing step; and
a display step of displaying the plurality of input images synthesized in the synthesizing step, wherein
in a case where the plurality of input images are determined in the determination step to be the plurality of divided images, the first margin image is generated from an edge portion of the second input image, the second margin image is generated from an edge portion of the first input image,
the image processing includes spatial filter processing in which a pixel value of a target pixel is rewritten to a value generated by weighting and synthesizing the pixel value of the target pixel and pixel values of neighboring pixels with weights according to their pixel positions,
(i) in case where the plurality of input images are determined in the determination step to be the plurality of divided images, in the image processing step, a first image processing unit of the plurality of image processing units performs the image processing on the first input image to which the first margin image has been added, and a second image processing unit of the plurality of image processing units performs the image processing on the second input image to which the second margin image has been added, and wherein
(ii) in case where the plurality of input images are determined in the determination step to be the plurality of independent images,
in the image processing step, the first image processing unit performs the image processing on the first input image to which the first margin image has not been added, and the second image processing unit performs the image processing on the second input image to which the second margin image has not been added.

9. The method of controlling an image display apparatus according to claim 8,
wherein, in the determination step, for each boundary portion between the input images upon arranging the plurality of input images in a predetermined arrangement, whether a change in a pixel value between the input images is continuous is determined, and whether the plurality of input images are the plurality of divided images or the plurality of independent images is determined based on a determination result.

10. The method of controlling age display apparatus according to claim 8,
wherein, in the image processing step, each of the plurality of image processing units performs the image processing on the input image to which any margin image has not been added in a case There the plurality of input images are determined in the determination step to be the plurality of independent images.

11. The method of controlling an image display apparatus according to claim 8,
wherein, in a case where the plurality of input images are determined in the determination step to be the plurality of independent images, in the margin adding step,
a margin image is generated from an edge portion of one input image of the plurality of input images, and
the margin image is added to an edge of the one input image.

12. The method of controlling an image display apparatus according to claim 8,
wherein, in the determination step, it is determined whether frame synchronizing signals of the plurality of input images are synchronized, and the plurality of input images are determined to be the plurality of independent images in a case where the frame synchronizing signals of the plurality of input images are not synchronized.

13. The method of controlling an image display apparatus according to claim 8, further comprising:
an acquisition step of acquiring, from the external image output apparatus, information regarding whether the plurality of input images are the plurality of divided images or the plurality of independent images,
wherein, in the determination step, whether the plurality of input images are the plurality of divided images or the plurality of independent images is determined by using the information acquired in the acquisition step.

14. The method of controlling an image display apparatus according to claim 8,
wherein in a ease where, by the plurality of image processing units, the image processing is performed on the plurality of input images to each of which the margin image has been added, in the synthesizing step, the margin images which have been added to the plurality of input images are deleted, and the plurality of input images from each of which the margin image has been deleted are synthesized.

15. An image display apparatus, comprising:
a CPU configured to perform functions of at least one of a plurality of image processing units, and a synthesizing unit;
the plurality of image processing units that perform an image processing on a plurality of input images, which is inputted from outside, to an edge of each of which a margin image has not been added;
the synthesizing unit that synthesizes the plurality of input images on which image processing has been performed by the plurality of image processing units; and
a display unit that displays the plurality of input images synthesized by the synthesizing unit, wherein
in a case where the plurality of input images are determined to be a plurality of divided images obtained by dividing one original image,
a first image processing unit of the plurality of image processing units performs the image processing on a first input image to an edge of which a first margin image has been added, wherein the first margin image is generated from an edge portion of a second input image which is adjacent to the first input image, and
a second image processing unit of the plurality of image processing units performs the image processing on a second input image to an edge of which a second margin image has been added, wherein the second margin image is generated from an edge portion of the first input image which is adjacent to the second input image, and wherein
in a case where the plurality of input images are determined to be a plurality of independent images,
the first image processing unit performs the image processing on the first input image to an edge of which the first margin image has not been added, and
the second image processing unit performs the image processing on the second input image to an edge of which the second margin image has not been added, and wherein
the image processing includes spatial filter processing in which a pixel value of a target pixel is rewritten to a value generated by weighting and synthesizing the pixel value of the target pixel and pixel values of neighboring pixels with weights according to their pixel positions.

16. The image display apparatus according to claim 15, further comprising:
a determination unit that determines, for each boundary portion between the input images upon arranging the plurality of input images in a predetermined arrangement, whether a change in a pixel value between the input images is continuous, and determines whether the plurality of input images are the plurality of divided images or the plurality of independent images based on a determination result.

17. The image display apparatus according to claim 15, wherein each of the plurality of image processing units performs the image processing on the input image to which any margin image has not been added in a case where the plurality of input images are determined to be the plurality of independent images.

18. The image display apparatus according to claim 15, wherein in a case where the plurality of input images are determined to be the plurality of independent images,
a margin image is generated from an edge portion of one input image of the plurality of input images, and
the margin image is added to an edge of the one input image.

19. The image display apparatus according to claim 15, further comprising:
a determination unit that determines whether frame synchronizing signals of the plurality of input images are synchronized, and determines that the plurality of input images are the plurality of independent images in a case where the frame synchronizing signals of the plurality of input images are not synchronized.

20. The image display apparatus according to claim 15, further comprising:
an acquisition unit that acquires, from an external image output apparatus that outputs the plurality of input images, information regarding whether the plurality of input images are the plurality of divided image or the plurality of independent images, and
a determination unit that determines whether the plurality of input images are the plurality of divided images or the plurality of independent images by using the information acquired by the acquisition unit.

21. The image display apparatus according to claim 15, wherein in a case where, by the plurality of image processing units, the image processing is performed on the plurality of input images to each of which the margin image has been added, the synthesizing unit deletes the margin images which have been added to the plurality of input images, and synthesizes the plurality of input images from each of which the margin image has been deleted.

22. An image display apparatus, comprising:
a CPU configured to perform functions of at least one of a first image processing unit, a second image processing unit, and a synthesizing unit;
the first image processing unit and the second image processing unit that respectively perform an image processing on a first target image based on a first input image and a second target image based on a second input image, wherein the first input image and the second input image are inputted from outside, and a margin image has not been added to each of the first input image and the second input image;
the synthesizing unit that synthesizes the first target image and the second target image on which the image processing has been performed by the first image processing unit and the second image processing unit; and
a display unit that displays the first target image and the second target image synthesized by the synthesizing unit, wherein
in a case where each of the first input image and the second input image is determined to be a divided image obtained by dividing one original image,
the first image processing unit performs the image processing on an image, as the first target image, which includes the first input image and a first margin image added to an edge of the first input image, wherein the first margin image is generated from an edge portion of the second input image, and
the second image processing unit performs the image processing on an image, as the second target image, which includes the second input image and a second margin image added to an edge of the second input image, wherein the second margin image is generated from an edge portion of the first input image, and wherein in a case where each of the first input image and the second input image is determined to be an independent image, the first image processing unit performs the image processing on an image, as the first target image, which includes the first input image but does not include the first margin image, and the second image processing unit performs the image processing on an image, as the second target image, which includes the second input image but does not include the second margin image, and wherein the image processing includes spatial filter processing in which a pixel value of a target pixel is rewritten to a value generated by weighting and synthesizing the pixel value of the target pixel and pixel values of neighboring pixels with weights according to their pixel positions.

23. The image display apparatus according to claim 22, further comprising:
a determination unit that determines, for a boundary portion between the first input image and the second input image upon arranging the first input image and the second input image in a predetermined arrangement, whether a change in a pixel value between the first input image and the second input image is continuous, and determines whether each of the first input image and the second input image is a divided image or an independent image based on a determination result.

24. The image display apparatus according to claim 22, wherein each of the first image processing unit and the second image processing unit performs the image processing on the first target image and the second target image to each of which any margin image has not been added in a case where each of the first input image and the second input image is determined to be an independent image.

25. The image display apparatus according to claim 22, wherein in a case where each of the first input image and the second input image is determined to be an independent image,
a margin image is generated from an edge portion of the first input image, and
the margin image is added to an edge of the first input image.

26. The image display apparatus according to claim 22, further comprising:
a determination unit that determines whether frame synchronizing signals of the first input image and the second target image are synchronized, and determines that each of the first input image and the second input image is an independent image in a case where the frame synchronizing signals of the first input image and the second target image are not synchronized.

27. The image display apparatus according to claim 22, further comprising:
an acquisition unit that acquires, frown an external image output apparatus that outputs the first input image and the second input image, information regarding whether each of the first input image and the second input image is a divided image or an independent images, and
a determination unit that determines whether each of the first image and the second input image is a divided image or independent image by using the information acquired by the acquisition unit.

28. The image display apparatus according to claim 22, wherein a case where, by the first image processing unit and the second image processing unit, the image processing is performed on the first target image which includes the first margin image and the second target image which includes the second margin image, the synthesizing unit deletes the first margin image of the first target image and the second margin image of the second target image, and synthesizes the first target image of which the first margin image has been deleted and the second target image of which the second margin image has been deleted.

* * * * *